United States Patent
Yamada et al.

(10) Patent No.: US 11,390,744 B2
(45) Date of Patent: Jul. 19, 2022

(54) INORGANIC FILLER, POLYARYLENE SULFIDE RESIN COMPOSITION, MOLDED ARTICLE, AND METHODS FOR PRODUCING SAME

(71) Applicant: DIC Corporation, Tokyo (JP)

(72) Inventors: Keisuke Yamada, Ichihara (JP); Hirokiyo Nakase, Ichihara (JP); Takashi Goto, Takaishi (JP); Masahiro Kajikawa, Takaishi (JP)

(73) Assignee: DIC Corporation, Tokyo (JP)

( * ) Notice: Subject to any disclaimer, the term of this patent is extended or adjusted under 35 U.S.C. 154(b) by 181 days.

(21) Appl. No.: 16/626,319

(22) PCT Filed: Jul. 2, 2018

(86) PCT No.: PCT/JP2018/025027
§ 371 (c)(1),
(2) Date: Dec. 23, 2019

(87) PCT Pub. No.: WO2019/009234
PCT Pub. Date: Oct. 1, 2019

(65) Prior Publication Data
US 2020/0115552 A1    Apr. 16, 2020

(30) Foreign Application Priority Data

Jul. 3, 2017  (JP) ............................ JP2017-130376
Jul. 3, 2017  (JP) ............................ JP2017-130377
Jul. 3, 2017  (JP) ............................ JP2017-130378

(51) Int. Cl.
| | | |
|---|---|---|
| *C08K 9/08* | (2006.01) | |
| *C08L 81/02* | (2006.01) | |
| *C08J 5/04* | (2006.01) | |
| *C08K 9/06* | (2006.01) | |
| *B29C 45/00* | (2006.01) | |

(52) U.S. Cl.
CPC .............. *C08L 81/02* (2013.01); *C08J 5/041* (2013.01); *C08J 5/042* (2013.01); *C08J 5/043* (2013.01); *C08K 9/06* (2013.01); *C08K 9/08* (2013.01); *B29C 45/0005* (2013.01); *C08K 2201/003* (2013.01); *C08L 2203/30* (2013.01)

(58) Field of Classification Search
CPC .................... C08K 9/08; C08L 81/02
See application file for complete search history.

(56) References Cited

U.S. PATENT DOCUMENTS

| | | | | |
|---|---|---|---|---|
| 5,039,719 A | * | 8/1991 | Watanabe | ............... C08L 77/00 |
| | | | | 523/213 |
| 2012/0238688 A1 | * | 9/2012 | Iwashita | ................. C08L 23/10 |
| | | | | 524/504 |
| 2017/0096557 A1 | | 4/2017 | Ohnishi et al. | |

FOREIGN PATENT DOCUMENTS

| | | | | |
|---|---|---|---|---|
| EP | 2128200 A1 | 12/2009 | | |
| EP | 3085515 A1 | 10/2016 | | |
| JP | 03050265 A | * 3/1991 | ......... | C08G 75/0209 |
| JP | 2013-036127 A | 2/2013 | | |
| JP | 2013-100194 A | 5/2013 | | |
| JP | 2014-065841 A | 4/2014 | | |
| JP | 2016-132710 A | 7/2016 | | |
| JP | 2016-160567 A | 9/2016 | | |
| JP | 2016-196711 A | 11/2016 | | |
| JP | 2017-014628 A | 1/2017 | | |
| WO | 2016/152845 A1 | 9/2016 | | |

OTHER PUBLICATIONS

Translation of JP 2016196711 (Year: 2021).*
Supplementary European Search Report dated Oct. 27, 2020, issued for European Patent Application No. 18828750.2.
International Search Report dated Aug. 7, 2018, issued for PCT/JP2018/025027.

\* cited by examiner

*Primary Examiner* — Michael M Dollinger
(74) *Attorney, Agent, or Firm* — Locke Lord LLP; James E. Armstrong, IV; Nicholas J. DiCeglie, Jr.

(57) ABSTRACT

More specifically, provided are a polyarylene sulfide resin composition including 100 parts by mass of a polyarylene sulfide resin and 1 to 100 parts by mass of an inorganic filler surface-treated with a sizing agent, wherein the sizing agent is a sizing agent (α) containing at least a urethane-modified epoxy resin having an alkoxy polyoxyalkylene structure and a urethane resin having a sulfonate group, a sizing agent (β) containing a copolymer (β1) having a mass average molecular weight of 5000 to 150000, which is obtained by radical copolymerization of a polymerizable monomer mixture of at least a (meth)acrylic acid ester and maleic acid (anhydride), or a sizing agent (γ) containing at least a polyether resin, a urethane resin, and a silane coupling agent, a molded article thereof, an inorganic filler used for the composition, and methods for producing them.

12 Claims, No Drawings

INORGANIC FILLER, POLYARYLENE SULFIDE RESIN COMPOSITION, MOLDED ARTICLE, AND METHODS FOR PRODUCING SAME

TECHNICAL FIELD

The present invention relates to an inorganic filler, a polyarylene sulfide resin composition, a polyarylene sulfide resin molded article, and methods for producing them.

BACKGROUND ART

Polyarylene sulfide resins (hereinafter sometimes abbreviated as PAS resins) represented by polyphenylene sulfide resins (hereinafter sometimes abbreviated as PPS resins) belong to highly heat-resistant super engineering plastics and have mechanical strength, rigidity, flame retardancy, chemical resistance, electrical characteristics, dimensional stability and the like, so that they are widely used in applications such as various electric and electronic parts, household electric parts, automotive parts, and mechanical parts, mainly for injection molding.

Generally, a polyarylene sulfide resin is reinforced with glass fibers in order to increase mechanical strength. Since an interface between a polyarylene sulfide resin and a glass fiber in a conventionally used glass fiber-reinforced polyarylene sulfide resin is weak to moisture and heat, a bond between the polyarylene sulfide resin and the glass fiber at the interface is damaged with the lapse of time. This causes a problem that the mechanical strength is lowered. In particular, since building material parts, automobile parts, construction machine parts, agricultural machine parts and the like are sometimes used in outdoor environments, there has been a demand for a glass fiber-reinforced polyarylene sulfide resin having excellent moisture and heat resistance.

In addition, polyarylene sulfide resins having excellent heat resistance and mechanical strength have attracted attention as members such as pipes and valves for fluid transfer used in heat exchangers, hot water supply apparatuses, garbage treatment apparatuses and the like (hereinafter sometimes referred to as fluid transfer members) instead of metal materials. However, when a polyarylene sulfide resin is used in this application, the piping may be broken or ruptured due to freezing of the internal fluid in winter, and therefore, a technique is known in which a thermoplastic elastomer is blended with the polyarylene sulfide resin to increase the flexibility of the resin composition and to prevent the breakage, rupture or the like due to freezing of the internal fluid (see PTL 1). However, also in this case, the moisture and heat resistance is insufficient, and there is a problem that the bond at the interface between the polyarylene sulfide resin and the glass fiber in the glass fiber-reinforced polyarylene sulfide resin is damaged by the moisture and heat with the lapse of time due to the use for a long time, and the mechanical strength is lowered.

Therefore, attempts have been made to improve the moisture and heat resistance by blending glass fibers surface-treated with a sizing agent containing at least an epoxy resin, a urethane resin, and a silane coupling agent into a polyarylene sulfide resin (see PTL 2). However, even in this case, the moisture and heat resistance is not sufficient and there is room for improvement.

CITATION LIST

Patent Literature

PTL 1: JP-A-2014-065841
PTL 2: JP-A-2016-132710

SUMMARY OF INVENTION

Technical Problem

Accordingly, an object of the present invention is to provide a polyarylene sulfide resin molded article having excellent mechanical strength and excellent moisture and heat resistance, a polyarylene sulfide resin composition for molding the molded article, an inorganic filler for use in the composition, and methods for producing them.

Solution to Problem

As a result of intensive studies to solve the above problems, the present inventors have found that a polyarylene sulfide resin mixed with glass fibers that are surface-treated with a sizing agent containing a specific resin can exhibit excellent moisture and heat resistance while having excellent mechanical strength, and have completed the present invention.

That is, the present invention relates to a polyarylene sulfide resin composition including: 100 parts by mass of a polyarylene sulfide resin (1); and 1 to 100 parts by mass of an inorganic filler (2) surface-treated with a sizing agent, wherein the sizing agent is at least one selected from the group consisting of:

a sizing agent (a) containing at least a urethane-modified epoxy resin ($\alpha1$) having an alkoxy polyoxyalkylene structure and a urethane resin ($\alpha2$) having a sulfonate group;

a sizing agent ($\beta$) containing a copolymer ($\beta1$) having a mass average molecular weight of 5000 to 150000, which is obtained by radical copolymerization of a polymerizable monomer mixture of at least a (meth)acrylic acid ester ($\beta1a$) and maleic acid (anhydride) ($\beta1m$) in a mass ratio [($\beta1a$)/($\beta1m$)] of (meth)acrylic acid ester ($\beta1a$) to maleic acid (anhydride) ($\beta1m$) of 7/3 to 3/7; and a sizing agent ($\gamma$) containing at least a polyether resin ($\gamma1$), a urethane resin ($\gamma2$), and a silane coupling agent ($\gamma3$).

The present invention also relates to a molded article obtained by molding the polyarylene sulfide resin composition.

The present invention also relates to a method for producing a polyarylene sulfide resin composition, including blending 1 to 100 parts by mass of an inorganic filler (2) surface-treated with a sizing agent with respect to 100 parts by mass of a polyarylene sulfide resin (1), and melt-kneading the mixture, wherein the sizing agent is at least one selected from the group consisting of:

a sizing agent ($\alpha$) containing at least a urethane-modified epoxy resin ($\alpha1$) having an alkoxy polyoxyalkylene structure and a urethane resin ($\alpha2$) having a sulfonate group;

a sizing agent ($\beta$) containing a copolymer ($\beta1$) having a mass average molecular weight of 5000 to 150000, which is obtained by radical copolymerization of a polymerizable monomer mixture of at least a (meth)acrylic acid ester ($\beta1a$) and maleic acid (anhydride) ($\beta1m$) in a mass ratio [($\beta1a$)/($\beta1m$)] of (meth)acrylic acid ester ($\beta1a$) to maleic acid (anhydride) ($\beta1m$) of 7/3 to 3/7; and a sizing agent ($\gamma$) containing at least a polyether resin ($\gamma1$), a urethane resin ($\gamma2$), and a silane coupling agent ($\gamma3$).

The present invention also relates to a method for producing a molded article, including melt molding the polyarylene sulfide resin composition obtained by the above-described production method.

Further, the present invention relates to an inorganic filler used in a polyarylene sulfide resin composition containing a polyarylene sulfide resin (1), wherein the inorganic filler is surface-treated with a sizing agent, and the sizing agent is at least one selected from the group consisting of:

a sizing agent (α) containing at least a urethane-modified epoxy resin (α1) having an alkoxy polyoxyalkylene structure and a urethane resin (α2) having a sulfonate group;

a sizing agent (β) containing a copolymer (β1) having a mass average molecular weight of 5000 to 150000, which is obtained by radical copolymerization of a polymerizable monomer mixture of at least a (meth)acrylic acid ester (β1a) and maleic acid (anhydride) (β1m) in a mass ratio [(β1a)/(β1m)] of (meth)acrylic acid ester (β1a) to maleic acid (anhydride) (β1m) of 7/3 to 3/7; and a sizing agent (γ) containing at least a polyether resin (γ1), a urethane resin (γ2), and a silane coupling agent (γ3).

The present invention also relates to a method for producing an inorganic filler used in a polyarylene sulfide resin composition containing a polyarylene sulfide resin (1), including surface-treating the inorganic filler with a sizing agent, wherein the sizing agent is at least one selected from the group consisting of:

a sizing agent (α) containing at least a urethane-modified epoxy resin (α1) having an alkoxy polyoxyalkylene structure and a urethane resin (α2) having a sulfonate group;

a sizing agent (β) containing a copolymer (β1) having a mass average molecular weight of 5000 to 150000, which is obtained by radical copolymerization of a polymerizable monomer mixture of at least a (meth)acrylic acid ester (β1a) and maleic acid (anhydride) (11m) in a mass ratio [(β1a)/(β1m)]of (meth)acrylic acid ester (β1a) to maleic acid (anhydride) (β1m) of 7/3 to 3/7; and a sizing agent (γ) containing at least a polyether resin (γ1), a urethane resin (γ2), and a silane coupling agent (γ3).

Advantageous Effects of Invention

According to the present invention, there can be provided a polyarylene sulfide resin molded article having excellent mechanical strength and excellent moisture and heat resistance, a polyarylene sulfide resin composition for molding the molded article, an inorganic filler for use in the composition, and methods for producing them.

DESCRIPTION OF EMBODIMENTS

Polyarylene sulfide resin (1) The polyarylene sulfide resin composition of the present invention contains a polyarylene sulfide resin (1) as an essential component. The polyarylene sulfide resin used in the present invention has a resin structure having a repeating unit of a structure in which an aromatic ring and a sulfur atom are bonded, and specifically, it is a resin having repeating units of a structural moiety represented by the following general formula (1):

[Chem. 1]

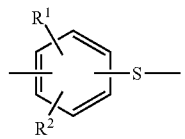

(1)

wherein $R^1$ and $R^2$ each independently represents a hydrogen atom, an alkyl group having 1 to 4 carbon atoms, a nitro group, an amino group, a phenyl group, a methoxy group, or an ethoxy group and, if necessary, a trifunctional structural moiety represented by the following general formula (2).

[Chem. 2]

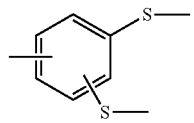

(2)

The content of the trifunctional structural moiety represented by the formula (2) is preferably in the range of 0.001 to 3 mol %, particularly preferably in the range of 0.01 to 1 mol % with respect to the total number of moles with other structural moieties.

In the structural moiety represented by the general formula (1), $R^1$ and $R^2$ in the formula are preferably a hydrogen atom from the viewpoint of the mechanical strength of the polyarylene sulfide resin, and examples thereof include the structural moiety bonded at the para position represented by the following formula (3) and the structural moiety bonded at the meta position represented by the following formula (4).

[Chem. 3]

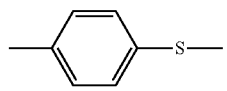

(3)

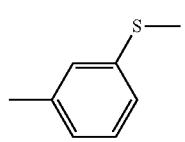

(4)

Among these, particularly the bond of the sulfur atom to the aromatic ring in the repeating unit is preferably a structure in which the sulfur atom is bonded at the para position represented by the general formula (4) in view of heat resistance and crystallinity of the polyarylene sulfide resin.

The polyarylene sulfide resins may contain not only the structural moiety represented by the general formula (1) or (2) but also structural moieties represented by the following structural formulas (5) to (8) in an amount of 30 mol % or less of the total of the structural moieties represented by the general formula (1) and the general formula (2).

[Chem. 4]

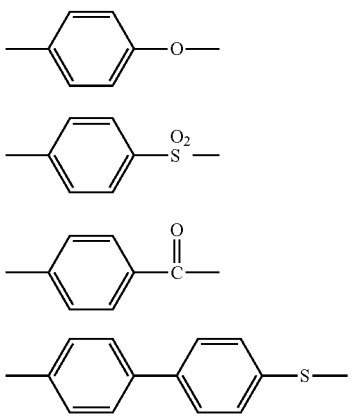

(5)
(6)
(7)
(8)

In particular, in the present invention, the content of the structural moieties represented by the general formulas (5) to (8) is preferably 10 mol % or less in view of heat resistance and mechanical strength of the polyarylene sulfide resin. When the polyarylene sulfide resin contains the structural moieties represented by the general formulas (5) to (8), the bonding mode thereof may be either a random copolymer or a block copolymer.

The polyarylene sulfide resin may have a naphthyl sulfide bond or the like in its molecular structure, but the content thereof is preferably 3 mol % or less, particularly preferably 1 mol % or less, with respect to the total number of moles with other structural moieties.

The physical properties of the polyarylene sulfide resin are not particularly limited as long as the effects of the present invention are not impaired, but are as follows.

(Melting Point (Tm) and Recrystallization Temperature (Tc2))

The melting point (Tm) of the polyarylene sulfide resin is preferably in the range of 270° C. or higher, and more preferably in the range of 270 to 300° C., in order to obtain a polyarylene sulfide resin composition having excellent heat resistance and mechanical strength. The recrystallization temperature (Tc2) of the polyarylene sulfide resin is preferably in the range of 200 to 260° C., in order to obtain a polyarylene sulfide resin composition having excellent heat resistance and mechanical strength.

(Melt Viscosity)

The polyarylene sulfide resin used in the present invention preferably has a melt viscosity (V6) measured at 300° C. in the range of 2 to 1000 [Pa·s], and more preferably in the range of 10 to 500 [Pa·s], and particularly preferably in the range of 60 to 200 [Pa·s], since the balance between fluidity and mechanical strength is improved. In the present invention, the melt viscosity (V6) is a value obtained by measuring the melt viscosity of a polyarylene sulfide resin using a flow tester CFT-500D manufactured by Shimadzu Corporation at 300° C. under a load of $1.96 \times 10^6$ Pa and L/D=10 (mm)/1 (mm) after holding for 6 minutes.

(Non-Newtonian Index)

The non-Newtonian index of the polyarylene sulfide resin used in the present invention is not particularly limited as long as the effects of the present invention are not impaired, but is preferably in the range of 0.90 to 2.00. When the linear polyarylene sulfide resin is used, the non-Newtonian index is preferably in the range of 0.90 to 1.50, and more preferably in the range of 0.95 to 1.20. Such a polyarylene sulfide resin is excellent in mechanical properties, fluidity, and abrasion resistance. Here, the non-Newtonian index (N value) is a value obtained by measuring the shear rate and the shear stress under the conditions of 300° C. and the ratio of the orifice length (L) to the orifice diameter (D), L/D=40 using a capilograph, and calculating using the following equation:

$$SR = K \cdot SS \qquad \text{[Math. 1]}$$

[wherein SR is the shear rate ($\sec^{-1}$), SS is the shear stress (dyne/cm$^2$), and K is a constant.] The closer the N value is to 1, the more linear the PPS structure is, and the higher the N value is, the more branched the structure is.

(Production Method)

Examples of the method for producing the polyarylene sulfide resin include, but are not limited to, 1) a method in which a dihalogeno aromatic compound is polymerized in the presence of sulfur and sodium carbonate, and if necessary, a polyhalogeno aromatic compound or other copolymerizable component is added, 2) a method in which a dihalogeno aromatic compound is polymerized in the presence of a sulfidizing agent in a polar solvent, and if necessary, a polyhalogeno aromatic compound or other copolymerizable component is added, and 3) a method of self-condensing p-chlorothiophenol, if necessary, with the addition of other copolymerizable component. Among these methods, the method 2) is widely used and preferable. In the reaction, an alkali metal salt of a carboxylic acid or a sulfonic acid or an alkali hydroxide may be added in order to adjust the degree of polymerization. In the above method (2), particularly preferred are a method for producing a polyarylene sulfide resin, which includes introducing a water-containing sulfidizing agent into a heated mixture containing an organic polar solvent and a dihalogeno aromatic compound at a rate at which water can be removed from the reaction mixture, reacting the dihalogeno aromatic compound with the sulfidizing agent in the organic polar solvent, and if necessary, adding a polyhalogeno aromatic compound, and controlling the amount of water in the reaction system to 0.02 to 0.5 mol per 1 mol of the organic polar solvent (see Japanese Unexamined Patent Application Publication No. 07-228699) and a method for producing a polyarylene sulfide resin, which includes adding a dihalogeno aromatic compound and if necessary a polyhalogeno aromatic compound and other copolymerizable component in the presence of a solid alkali metal sulfide and an aprotic polar organic solvent, and allowing them to react with an alkali metal hydrosulfide and an organic acid alkali metal salt with the amount of the organic acid alkali metal salt in the range of 0.01 to 0.9 mol per 1 mol of the sulfur source in a state where the amount of water existing in the reaction system is controlled to 0.02 mol or less per 1 mol of the aprotic polar organic solvent (see WO 2010/058713). Specific examples of the dihalogeno aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and compounds having an alkyl group having 1 to 18 carbon atoms in the aromatic ring of each of the above compounds, and specific examples of the polyhalogeno aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. The halogen atom contained in each of the compounds is preferably a chlorine atom or a bromine atom.

The post-treatment method of the reaction mixture containing the polyarylene sulfide resin obtained in the polymerization step is not particularly limited, and examples thereof include: (1) a method in which, after completion of the polymerization reaction, the reaction mixture is first subjected to distillation of the solvent as it is or after addition of an acid or a base under reduced pressure or normal pressure, and then the solid matter after the distillation of the solvent is washed 1 or 2 times or more with a solvent such as water, a reaction solvent (or an organic solvent having an equivalent solubility to a low molecular weight polymer), acetone, methyl ethyl ketone, and alcohols, and further neutralized, washed with water, filtered and dried; (2) a method in which, after completion of the polymerization reaction, a solvent such as water, acetone, methyl ethyl ketone, alcohols, ethers, halogenated hydrocarbons, aromatic hydrocarbons, or aliphatic hydrocarbons (a solvent which is soluble in the used polymerization solvent and is a poor solvent at least for the polyarylene sulfide) is added to the reaction mixture as a precipitant to precipitate a solid product such as polyarylene sulfide or an inorganic salt, followed by filtration, washing, and drying; (3) a method in which, after completion of the polymerization reaction, a reaction solvent (or an organic solvent having an equivalent solubility in a low molecular weight polymer) to the reaction mixture, and stirred, followed by filtration to remove the low molecular weight polymer, the reaction mixture is washed 1 or 2 times or more with a solvent such as water, acetone, methyl ethyl ketone or alcohols, followed by neutralization, washing with water, filtration and drying; (4) a method of adding water to the reaction mixture after the completion of the polymerization reaction, followed by washing with water and filtration, optionally adding an acid at the time of washing with water, followed by acid treatment and drying; and (5) a method of filtering the reaction mixture after the completion of the polymerization reaction, optionally washing 1 or 2 times or more with a reaction solvent, followed by washing with water, filtration and drying.

In the post-treatment method as exemplified in (1) to (5) above, the polyarylene sulfide resins may be dried in vacuum or in air or in an inert gas atmosphere such as nitrogen.

Inorganic Filler (2) Surface-Treated with Sizing Agent

The polyarylene sulfide resin composition of the present invention contains the polyarylene sulfide resin (1) and an inorganic filler (2) surface-treated with a sizing agent as essential components. As the inorganic filler (2), known and commonly used materials can be used as long as the effects of the present invention are not impaired, and examples thereof include fillers of various shapes such as fibrous fillers and non-fibrous fillers such as granular fillers and plate fillers, among which fibrous fillers are preferred because they are superior in mechanical strength and moisture and heat resistance, and fibrous fillers having a fiber diameter of preferably 1 to 50 µm, more preferably 6 to 15 µm are more preferred because they simultaneously exhibit superior mechanical strength and high toughness.

Specific examples of the inorganic filler (2) include fibrous fillers such as glass fiber, carbon fiber, silane glass fiber, ceramic fiber, aramid fiber, metal fiber, potassium titanate fiber, silicon carbide fiber, calcium silicate fiber, wollastonite fiber and natural fiber, and non-fibrous fillers such as glass beads, glass flakes, barium sulfate, clay, pyrophyllite, bentonite, sericite, mica, talc, attapulgite, ferrite, calcium silicate, calcium carbonate, magnesium carbonate, zeolite, milled fiber and calcium sulfate.

When the inorganic filler (2) is a glass fiber, for example, a material obtained using an alkali-containing glass, a low-alkali glass, an alkali-free glass (E glass), or the like as a raw material can be used, and it is particularly preferable to use an alkali-free glass which has little deterioration with time and stable mechanical properties.

When the inorganic filler (2) is a carbon fiber, for example, a polyacrylonitrile-based or pitch-based carbon fiber can be used, but a polyacrylonitrile-based carbon fiber is preferably used from the viewpoint of imparting excellent strength.

Sizing Agent

The sizing agent used in the present invention is at least one selected from the group consisting of:

a sizing agent ($\alpha$) containing at least a urethane-modified epoxy resin ($\alpha 1$) having an alkoxy polyoxyalkylene structure and a urethane resin ($\alpha 2$) having a sulfonate group;

a sizing agent ($\beta$) containing a copolymer ($\beta 1$) having a mass average molecular weight of 5000 to 150000, which is obtained by radical copolymerization of a polymerizable monomer mixture of at least a (meth)acrylic acid ester ($\beta 1a$) and maleic acid (anhydride) ($1m$) in a mass ratio $[(\beta 1a)/(\beta 1m)]$ of (meth)acrylic acid ester ($\beta 1a$) to maleic acid (anhydride) ($\beta 1m$) of 7/3 to 3/7; and a sizing agent ($\gamma$) containing at least a polyether resin ($\gamma 1$), a urethane resin ($\gamma 2$), and a silane coupling agent ($\gamma 3$).

Sizing Agent ($\alpha$)

The inorganic filler (2) used in the present invention may be surface-treated with the sizing agent (or) containing the urethane-modified epoxy resin ($\alpha 1$) having an alkoxy polyoxyalkylene structure and the urethane resin ($\alpha 2$) having a sulfonate group. The polyarylene sulfide resin molded article obtained by using the inorganic filler (2) is excellent in interfacial adhesion with the polyarylene sulfide as the matrix resin, and thus excellent in mechanical strength and moisture and heat resistance.

The urethane-modified epoxy resin ($\alpha 1$) having an alkoxy polyoxyalkylene structure will be described. The urethane-modified epoxy resin ($\alpha 1$) has an alkoxy polyoxyalkylene structure, and the alkoxy polyoxyalkylene structure is a structure in which one end of a polyoxyalkylene chain is blocked with an alkoxy group.

Examples of the polyoxyalkylene chain include a polyoxyethylene chain, a polyoxypropylene chain and a polyoxybutylene chain, and those in which these chains are arranged in a block or random manner are also included.

Examples of the alkoxy group for blocking the terminal of the polyoxyalkylene chain include a methoxy group, an ethoxy group, a propoxy group, and a butoxy group.

The alkoxy polyoxyalkylene structure preferably has an oxyethylene unit structure in an amount of 40% by mass or more in the structure from the viewpoint of further improving water dispersibility.

The alkoxy polyoxyalkylene structure preferably has a number-average molecular weight of 300 to 7,000 from the viewpoint of further improving water dispersibility.

The alkoxy polyoxyalkylene structure is present in the epoxy resin ($\alpha 1$) in an amount of preferably 3% by mass or more, more preferably 10% by mass or more, and preferably 60% by mass or less, more preferably 55% by mass or less, from the viewpoint of further improving water dispersibility.

The urethane-modified epoxy resin ($\alpha 1$) can be produced, for example, by reacting a compound ($\alpha 1$-1) having an epoxy group and a hydroxyl group, a polyisocyanate ($\alpha 1$-2), a polyoxyalkylene monoalkyl ether ($\alpha 1$-3), optionally a polyol (α1-4) other than the compound (α1-1), and a chain extender (α1-5) by a conventionally known method in the absence of a solvent or in the presence of an organic solvent. Specifically, in consideration of safety, the reaction is preferably carried out at a reaction temperature of 50° C. or higher and 120° C. or lower for 1 hour or more and 15 hours or less.

Examples of the compound (α1-1) having an epoxy group and a hydroxyl group which can be used include a bisphenol A type epoxy resin having a hydroxyl group, and a compound in which a part of epoxy groups contained in a bisphenol type epoxy resin such as bisphenol A and bisphenol F, a phenol novolac type epoxy resin, an ethylphenol novolac type epoxy resin, a butylphenol novolac type epoxy resin, an octylphenol novolac type epoxy resin, a cresol novolac type epoxy resin such as orthocresol novolak type epoxy resin, a resorcin novolac type epoxy resin, a bisphenol A novolac type epoxy resin, a bisphenol F novolac type epoxy resin, a bisphenol AD novolac type epoxy resin, a bisphenol S novolac type epoxy resin, or the like is ring-opened by reacting with a carboxylic acid or the like to form a hydroxyl group.

As the compound (α1-1), a phenol novolac type epoxy resin having a hydroxyl group, a cresol novolac type epoxy resin having a hydroxyl group, or a bisphenol A type epoxy resin having a hydroxyl group is preferably used from the viewpoint of further improving mechanical strength of the obtained molded article.

As the compound (α1-1), a compound having an epoxy equivalent of preferably 100 g/equivalent or more, and preferably 2,000 g/equivalent or less, more preferably 500 g/equivalent or less is more preferably used.

The content of the hydroxyl group contained in the compound (α1-1) is preferably in the range of 5 mol % or more, and preferably 150 mol % or less, more preferably 130 mol % or less, and still more preferably 120 mol % or less, with respect to the total amount of the epoxy groups in the urethane-modified epoxy resin (α1), since the fiber sizing properties and the mechanical strength of the obtained molded article can be further improved.

The reaction between a part of the epoxy groups of the epoxy resin and the carboxylic acid can be carried out by mixing the epoxy resin and the carboxylic acid in a reaction vessel and stirring the mixture at 40° C. or higher and 90° C. or lower for 5 hours or more and 15 hours or less.

Examples of the polyisocyanate (α1-2) which can be used include an aromatic polyisocyanate such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, naphthalene diisocyanate, xylylene diisocyanate, and tetramethylxylylene diisocyanate, an aliphatic polyisocyanate such as hexamethylene diisocyanate, lysine diisocyanate, and cyclohexane diisocyanate, a polyisocyanate having an aliphatic cyclic structure such as isophorone diisocyanate and dicyclohexylmethane diisocyanate, a nurate product thereof, and an adduct product with trimethylolpropane. Of these, diisocyanates are preferably used.

The polyoxyalkylene monoalkyl ether (α1-3) is represented by the following general formula (b1).

[Chem. 5]

(b1)

In formula (b1), $R^1$ represents an alkyl group, $R^2$ represents an alkylene group, and n represents an integer of 1 or more.

In the polyoxyalkylene monoalkyl ether (α1-3), $R^1$ in the general formula (b1) is preferably a methyl group, an ethyl group, a propyl group, or a butyl group, and more preferably a methyl group, from the viewpoint of further improving storage stability.

In addition, $R^2$ in the general formula (b1) is preferably an ethylene group or a propylene group, and more preferably an ethylene group, from the viewpoint of further improving storage stability and fiber sizing properties.

In the general formula (b1), n is preferably an integer of 5 to 150, and more preferably an integer of 5 to 100, from the viewpoint of further improving storage stability, fiber sizing properties, and the strength of the obtained molded article.

The polyoxyalkylene monoalkyl ether (α1-3) has a hydroxyl value of preferably 10 or more, more preferably 15 or more, and preferably 200 or less, from the viewpoint of further improving storage stability.

As the polyoxyalkylene monoalkyl ether (α1-3), polyoxyethylene monoalkyl ether is more preferably used, and polyoxyethylene monomethyl ether is particularly preferably used, from the viewpoint of further improving storage stability and fiber sizing properties.

Examples of the polyol (α1-4) which can be used include polyether polyol, polycarbonate polyol, polyester polyol, ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerin, trimethylolpropane, an acrylic polyol obtained by introducing a hydroxyl group into an acrylic copolymer, polybutadiene polyol which is a copolymer of butadiene having a hydroxyl group in the molecule, hydrogenated polybutadiene polyol, and a partially saponified ethylene-vinyl acetate copolymer.

Examples of the polyether polyol which can be used include a polyether polyol obtained by addition polymerization of an alkylene oxide using one kind or two or more kinds of compounds having two or more active hydrogen atoms as an initiator.

In addition, examples of the polycarbonate polyol which can be used include a polycarbonate polyol obtained by reacting a carbonate ester with a polyol, and a polycarbonate polyol obtained by reacting phosgene with bisphenol A or the like.

Examples of the polyester polyol which can be used include a polyester polyol obtained by an esterification reaction of a low molecular weight polyol and a polycarboxylic acid, a polyester obtained by a ring-opening polymerization reaction of a cyclic ester compound such as ε-caprolactone or γ-butyrolactone, and a copolymerized polyester thereof.

As the polyether polyol, the polycarbonate polyol, and the aliphatic polyester polyol, those having a number average molecular weight of preferably 300 or more, more preferably 500 or more, and preferably 4,000 or less, more preferably 2,000 or less can be used.

Examples of the chain extender (α1-5) which can be used include a polyamine and other compounds having an active hydrogen atom.

Examples of the polyamine which can be used include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; N-hydroxymethylaminoethylamine, N-hydroxyethylaminoethylamine, N-hydroxypropylaminopropylamine, N-ethylaminoethylamine, N-methylaminopropylamine; diethylenetriamine, dipropylenetriamine, triethylenetetramine; hydrazine, N,N'-dimethylhydrazine, 1,6-hexamethylenebishydrazine; succinic acid dihydrazide, adipic acid dihydrazide, glutaric acid dihydrazide, sebacic acid dihydrazide, isophthalic acid dihydrazide; β-semicarbazide propionic acid hydrazide, 3-semicarbazide propyl carbazic acid ester, and semicarbazide-3-semicarbazide methyl-3,5,5-trimethylcyclohexane.

Examples of other active hydrogen-containing compounds which can be used include glycol compounds such as triethylene glycol, 1,3-propanediol, saccharose, methylene glycol, and sorbitol; phenol compounds such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water.

The chain extender (α1-5) is preferably used, for example, in the range in which the equivalent ratio of the amino group of the polyamine to the excess isocyanate group is 1.9 or less (equivalent ratio), and more preferably in the range of 0.3 or more and 1.0 or less (equivalent ratio).

The urethanization reaction may be carried out in the absence of a catalyst, but known catalysts such as stannous octoate, dibutyltin dilaurate, dibutyltin dimaleate, dibutyltin diphthalate, dibutyltin dimethoxide, dibutyltin diacetyl acetate, dibutyltin diversatate, and other tin compounds; tetrabutyl titanate, tetraisopropyl titanate, triethanolamine titanate, and other titanate compounds; and other tertiary amine compounds, quaternary ammonium salts, and the like may be used.

The epoxy group of the urethane-modified epoxy resin (α1) is preferably present in an epoxy equivalent of the urethane-modified epoxy resin (α1) in the range of 250 g/equivalent or more to 2,000 g/equivalent or less, since the sizing properties are improved and a molded article having higher strength can be obtained.

The urethane resin (α2) having a sulfonate group will be described. Although the urethane resin (α2) has a sulfonate group, the concentration of the sulfonate group in the urethane resin (α2) is preferably in the range of 0.02 mmol/g or more, more preferably 0.05 mmol/g or more, and preferably 1 mmol/g or less, more preferably 0.7 mmol/g or less, from the viewpoint of further improving stability in water dispersion.

Further, the concentration of the carboxyl group in the urethane resin (α2) is preferably 0.05 mmol/g or less, but is preferably 0.02 mmol/g or less, more preferably 0.01 mmol/g or less, from the viewpoint of further improving storage stability of the epoxy group.

The urethane resin (α2) has a mass average molecular weight of preferably 8,000 or more, more preferably 10,000 or more, and preferably 300,000 or less, more preferably 200,000 or less, from the viewpoint of further improving mechanical strength and storage stability of the obtained molded article.

The urethane resin (α2) preferably has a glass transition temperature in the range of preferably −80° C. or higher, and preferably 60° C. or lower, more preferably 10° C. or lower, from the viewpoint of further improving mechanical strength of the obtained molded article.

The urethane resin (α2) may be any as long as it has a sulfonate group, and can be produced, for example, by reacting a polyol (α2-1) having a sulfonate group, a polyisocyanate (α2-2), optionally a chain extender (α2-3), and a polyol (α2-4) other than the polyol (α2-1) by a conventionally known method in the absence of a solvent or in the presence of an organic solvent. Specifically, in consideration of safety, the reaction is preferably carried out at a reaction temperature in the range of 50° C. or higher and 120° C. or lower for 1 hour or more and 15 hours or less.

Examples of the polyol (α2-1) having a sulfonate group which can be used include a polyol obtained by introducing a sulfonate group into the polyol described as the polyol (α1-4) which can be used for producing the urethane-modified epoxy resin (α1). Among these, a polyester polyol (α2-1-1) having a sulfonate group is preferable because the urethane resin (α2) has good thermal decomposition resistance.

The sulfonate group of the polyester polyol (α2-1-1) can be introduced into the polyester polyol (α2-1-1) by using a compound having a sulfonate group, such as a polyol having a sulfonate group, a polycarboxylic acid having a sulfonate group or an esterified product thereof, as a raw material.

Examples of the polyol having a sulfonate group used as a raw material of the polyester polyol (α2-1-1) which can be used include a polyol obtained by sulfonating a polyol having an unsaturated group such as 2-butene-1,4-diol.

Examples of the other polyol used as a raw material of the polyester polyol (α2-1-1) which can be used include aliphatic diols such as ethylene glycol, 1,2-propanediol, 1,3-propanediol, 1,4-butanediol, 2-methyl-1,3-propanediol, 1,5-pentanediol, neopentyl glycol, 1,6-hexanediol, 3-methyl-1,5-pentanediol, 1,9-nonanediol, 2-ethyl-2-butylpropanediol, diethylene glycol, triethylene glycol, and dipropylene glycol; diols having an aliphatic cyclic structure such as 1,4-cyclohexanedimethanol; and polyols having 3 or more hydroxyl groups such as glycerin, trimethylolethane, trimethylolpropane, and pentaerythritol. These polyols may be used alone or in combination of two or more kinds thereof.

Examples of the polycarboxylic acid having a sulfonate group and its esterified product used as the raw material of the polyester polyol (α2-1-1) include metal salts such as 4-sulfoisophthalic acid, 5-sulfoisophthalic acid, sulfoterephthalic acid, 4-sulfonaphthalene-2,7-dicarboxylic acid, and their esterified products. Among these, from the viewpoint of improving the reaction efficiency in the production of the polyester polyol (α2-1-1), an esterified product of 5-sodium sulfoisophthalic acid is preferably used, and dimethyl 5-sodium sulfoisophthalate is more preferably used.

Examples of other polycarboxylic acids used as the raw material of the polyester polyol (α2-1-1) which can be used include aromatic dicarboxylic acids such as terephthalic acid, isophthalic acid, orthophthalic acid, naphthalenedicarboxylic acid, and biphenyldicarboxylic acid; saturated or unsaturated aliphatic dicarboxylic acids such as oxalic acid, succinic acid, succinic anhydride, adipic acid, azelaic acid, sebacic acid, dodecanedioic acid, hydrogenated dimer acid, fumaric acid, maleic acid, maleic anhydride, itaconic acid, itaconic anhydride, citraconic acid, citraconic anhydride, and dimer acid; and dicarboxylic acids having an aliphatic cyclic structure such as 1,4-cyclohexanedicarboxylic acid, 1,3-cyclohexanedicarboxylic acid, 1,2-cyclohexanedicarboxylic acid, 2,5-norbornenedicarboxylic acid and its anhydride, and tetrahydrophthalic acid and its anhydride. Among these, aromatic dicarboxylic acids (anhydrides) are preferably used, and terephthalic acid or isophthalic acid is more preferably used, from the viewpoint of further improving heat resistance.

In addition to the above polycarboxylic acids, polycarboxylic acids having three or more carboxyl groups such as trimellitic acid, pyromellitic acid, benzophenone tetracarboxylic acid, trimellitic anhydride, pyromellitic anhydride, benzophenone tetracarboxylic anhydride, trimesic acid, ethylene glycol bis(anhydrotrimellitate), glycerol tris(anhydrotrimellitate), and 1,2,3,4-butanetetracarboxylic acid can also be used. These polycarboxylic acids may be used alone or in combination of two or more kinds thereof.

In addition, as a raw material of the polyester polyol ($\alpha$2-1-1), a cyclic ester compound such as $\varepsilon$-caprolactone or $\gamma$-butyrolactone may be used. These cyclic ester compounds may be used alone or in combination of two or more kinds thereof. Among these, $\varepsilon$-caprolactone is preferably used from the viewpoint of further improving adhesiveness to the matrix resin and sizing properties.

The polyester polyol ($\alpha$2-1-1) can be produced by subjecting the polyol and the polycarboxylic acid to an esterification reaction in the absence of a solvent or in an organic solvent by a conventionally known method. Moreover, if necessary, a compound obtained by ring-opening of a cyclic ester compound can be subjected to an esterification reaction.

The esterification reaction can be carried out by heating the polyol and the polycarboxylic acid at 180° C. to 300° C. in an inert gas atmosphere in the presence or absence of a catalyst to effect an esterification reaction or a transesterification reaction, followed by polycondensation.

In addition, the compound having a sulfonate group used in the production of the polyester polyol ($\alpha$2-1-1) is preferably used in an amount of 3% by mass or more and 30% by mass or less of the total amount of the polyol and the polycarboxylic acid from the viewpoint of further improving storage stability.

In the polyester polyol ($\alpha$2-1-1), the hydroxyl value of the polyester polyol ($\alpha$2-1-1) is preferably in the range of 50 or more and 500 or less from the viewpoint of further improving sizing properties and mechanical strength.

As the polyisocyanate ($\alpha$2-2), those described as the polyisocyanate ($\alpha$1-2) that can be used for producing the urethane-modified epoxy resin ($\alpha$1) can be used.

As the chain extender ($\alpha$2-3), those described as the chain extender ($\alpha$1-5) that can be used for producing the urethane-modified epoxy resin ($\alpha$1) can be used.

As the polyol ($\alpha$2-4), the polyol described as the polyol ($\alpha$1-4) that can be used for producing the urethane-modified epoxy resin ($\alpha$1) can be used.

Moreover, in the production of the urethane resin ($\alpha$2), the catalysts described as usable for producing the urethane-modified epoxy resin ($\alpha$1) can be used.

Examples of the aqueous medium include water, organic solvents miscible with water, and mixtures thereof. Examples of the organic solvent miscible with water include alcohol compounds such as methanol, ethanol, n- and isopropanol; ketone compounds such as acetone and methyl ethyl ketone; polyalkylene glycol compounds such as ethylene glycol, diethylene glycol and propylene glycol; alkyl ether compounds of polyalkylene glycol; and lactam compounds such as N-methyl-2-pyrrolidone. In the present invention, only water may be used, a mixture of water and an organic solvent miscible with water may be used, or only an organic solvent miscible with water may be used. In view of safety and environmental load, water alone or a mixture of water and an organic solvent miscible with water is preferable, and water alone is particularly preferable.

Examples of the method for producing the sizing agent ($\alpha$) include a method in which the urethane-modified epoxy resin ($\alpha$1) dissolved or dispersed in an aqueous medium and the urethane resin ($\alpha$2) dissolved or dispersed in an aqueous medium are mixed, and a method in which the urethane-modified epoxy resin ($\alpha$1) and the urethane resin ($\alpha$2) are mixed and the obtained mixture is further mixed with an aqueous medium.

The mass ratio of the urethane-modified epoxy resin ($\alpha$1) in the solid content of the sizing agent ($\alpha$) is preferably in the range of 20% by mass or more, more preferably 30% by mass or more, and preferably 90% by mass or less, more preferably 80% by mass or less, from the viewpoint of further improving fiber openability and mechanical strength.

The mass ratio of the urethane resin ($\alpha$2) in the solid content of the sizing agent ($\alpha$) is preferably 10% by mass or more, more preferably 20% by mass or more, and preferably 80% by mass or less, more preferably 70% by mass or less, from the viewpoint of further improving sizing properties and mechanical strength.

The mass ratio of the aqueous medium in the sizing agent ($\alpha$) is preferably in the range of 20% by mass or more, more preferably 30% by mass or more, and preferably 98% by mass or less, more preferably 90% by mass or less, from the viewpoint of further improving storage stability and coating workability.

The mass ratio of the solid content in the sizing agent ($\alpha$) is preferably in the range of 2% by mass or more, more preferably 10% by mass or more, and preferably 80% by mass or less, more preferably 70% by mass or less, from the viewpoint of further improving storage stability and coating workability.

The sizing agent ($\alpha$) may optionally contain additives such as a silane coupling agent, a curing catalyst, a lubricant, a filler, a thixotropic agent, a tackifier, a wax, a heat stabilizer, a light stabilizer, a fluorescent brightener, and a foaming agent, a pH adjustor, a leveling agent, an antigelling agent, a dispersion stabilizer, an antioxidant, a radical scavenger, a heat resistance-imparting agent, an inorganic filler, an organic filler, a plasticizer, a reinforcing agent, a catalyst, an antibacterial agent, an antifungal agent, a rust inhibitor, a thermoplastic resin, a thermosetting resin, a pigment, a dye, a conductive agent, an antistatic agent, a moisture permeability improver, a water repellent, an oil repellent, a hollow foam, a compound containing crystal water, a flame retardant, a water absorbent, a moisture absorbent, a deodorant, a foam stabilizer, a defoaming agent, an antiseptic, an antialgal agent, a pigment dispersant, an antiblocking agent, and a hydrolysis inhibitor in combination.

The sizing agent ($\alpha$) may be used in combination with an emulsion of vinyl acetate, ethylene vinyl acetate, acrylic, epoxy, urethane, polyester, polyamide or the like; a latex of styrene-butadiene, acrylonitrile-butadiene, acryl-butadiene or the like; or a water-soluble resin such as polyvinyl alcohol or cellulose.

As the sizing agent ($\alpha$), an emulsifier or the like may be used as long as the effects of the present invention are not impaired. The amount of the emulsifier used is preferably 10 parts by mass or less with respect to 100 parts by mass of the total of the urethane-modified epoxy resin ($\alpha$1) and the urethane resin ($\alpha$2).

Examples of the method for forming a film on the surface of the inorganic filler (2) using the sizing agent ($\alpha$) of the present invention include a method in which the sizing agent ($\alpha$) is uniformly applied to the surface by a known method such as a kiss coater method, a roller method, an immersion method, a spray method, or using a brush. When the sizing agent (α) contains an aqueous medium or an organic solvent as a solvent, it is preferable to heat and dry the sizing agent (α) after the application using a heating roller, hot air, a hot plate, or the like.

The adhesion amount (coating amount) of the sizing agent formed on the surface of the inorganic filler (2) is in the range of preferably 0.01 parts by mass or more, more preferably 0.05 parts by mass or more, still more preferably 0.1 parts by mass or more, and most preferably 0.3 parts by mass or more, to preferably 5 parts by mass or less, more preferably 2 parts by mass or less, and still more preferably 1.5 parts by mass or less, with respect to 100 parts by mass of the inorganic filler (2) surface-treated with the sizing agent.

Sizing Agent (β)

The inorganic filler (2) used in the present invention may be surface-treated with the sizing agent (β) containing the copolymer (β1) having a mass average molecular weight of 5000 to 150000, which is obtained by radical copolymerization of a polymerizable monomer mixture of the (meth) acrylic acid ester (β1a) and maleic acid (anhydride) (11m) in a mass ratio [(β1a)/(β1m)] of (meth)acrylic acid ester (β1a) to maleic acid (anhydride) (11m) of 7/3 to 3/7. The polyarylene sulfide resin molded article obtained by using the inorganic filler (2) surface-treated with the sizing agent (β) is excellent in interfacial adhesion with the polyarylene sulfide which is the matrix resin, and hence is excellent in mechanical strength and moisture and heat resistance.

The copolymer (β1) used in the present invention is obtained by radical polymerization of a polymerizable monomer mixture of at least a (meth)acrylate ester, particularly preferably a (meth)acrylate ester represented by $H_2C=CXHCOOR^1$ (wherein X represents a hydrogen atom or a methyl group, and $R^1$ represents a linear or branched alkyl group having 1 to 4 carbon atoms) and maleic acid (anhydride) with a radical initiator in the presence of an organic solvent. A part or all of the copolymer (β1) may be neutralized with a basic compound to convert the carboxyl group into a salt, and the salt may be dispersed in water to form an aqueous dispersion. The aqueous dispersion may be further desolvated.

The aqueous dispersion preferably has an average particle diameter in the range of 500 nm or less for reasons of film-forming properties and wettability to the surface of the inorganic filler. The term "average particle diameter" as used herein refers to an average particle diameter on a volume basis measured by a dynamic light scattering method.

The copolymer (β1) is preferably contained in an amount of 10% by mass or more and 70% by mass or less with respect to the total amount of the aqueous dispersion for reasons of resin storage stability and resin coating suitability.

Here, examples of the (meth)acrylic acid ester include methyl acrylate, ethyl acrylate, n-propyl acrylate, isopropyl acrylate, n-butyl acrylate, isobutyl acrylate, methyl methacrylate, ethyl methacrylate, n-propyl methacrylate, isopropyl methacrylate, n-butyl methacrylate, and isobutyl methacrylate, and n-butyl methacrylate is particularly preferable in consideration of the balance between sizing properties and mechanical strength.

Examples of the basic compound include organic amines such as ammonia, triethylamine, dimethylethanolamine, pyridine, and morpholine; alkanolamines such as monoethanolamine; and metal base compounds containing Na, K, Li, Ca and the like.

The neutralization ratio by the basic compound is preferably 80% or more, more preferably 100% or more, in consideration of resin stability after dispersion, although it depends on the solid acid value of the modified polyolefin.

As the organic solvent, organic solvents such as ester type, aromatic type, ketone type, alcohol type and the like can be used, but in consideration of the radical polymerization temperature, desolvation and the like, ester type or alcohol type, particularly butyl acetate, ethyl acetate, isobutanol, butanol and isopropyl alcohol are preferable.

The copolymer (β1) preferably has a mass average molecular weight in the range of 5,000 or more and 150,000 or less, because the copolymer (β1) can provide excellent moisture and heat resistance and excellent mechanical properties. Here, the mass average molecular weight is a value measured by gel permeation chromatography (GPC).

The solid acid value of the copolymer (β1) is in the range of preferably 340 mgKOH/g or more, more preferably 440 mgKOH/g or more, and preferably 800 mgKOH/g or less, more preferably 690 mgKOH/g or less.

In addition, the mixture may be converted into a salt by neutralizing a part or all of the carboxyl groups with a basic compound in a state where the polymerization is completed in a solvent to obtain the copolymer (β1), and then, if necessary, an emulsifier may be added at a ratio of 10 parts by mass or less with respect to 100 parts by mass of the copolymer (β1), and then an aqueous solvent may be added to obtain an aqueous dispersion. The aqueous dispersion may be distilled under reduced pressure to remove the solvent. Examples of the aqueous medium include water, organic solvents miscible with water, and mixtures thereof. Examples of the organic solvent miscible with water include alcohol compounds such as methanol, ethanol, n- and isopropanol; ketone compounds such as acetone and methyl ethyl ketone; polyalkylene glycol compounds such as ethylene glycol, diethylene glycol and propylene glycol; alkyl ether compounds of polyalkylene glycol; and lactam compounds such as N-methyl-2-pyrrolidone. In the present invention, only water may be used, a mixture of water and an organic solvent miscible with water may be used, or only an organic solvent miscible with water may be used. In view of safety and environmental load, water alone or a mixture of water and an organic solvent miscible with water is preferable, and water alone is particularly preferable.

In addition to the copolymer (β1), the sizing agent (β) used in the present invention may optionally contain an additive such as a silane coupling agent, a curing catalyst, a lubricant, a filler, a thixotropic agent, a tackifier, a wax, a heat stabilizer, a light stabilizer, a fluorescent brightener, and a foaming agent, a pH adjustor, a leveling agent, an anti-gelling agent, a dispersion stabilizer, an antioxidant, a radical scavenger, a heat resistance-imparting agent, an inorganic filler, an organic filler, a plasticizer, a reinforcing agent, a catalyst, an antibacterial agent, an antifungal agent, a rust inhibitor, a thermoplastic resin, a thermosetting resin, a pigment, a dye, a conductive agent, an antistatic agent, a moisture permeability improver, a water repellent, an oil repellent, a hollow foam, a compound containing crystal water, a flame retardant, a water absorbent, a moisture absorbent, a deodorant, a foam stabilizer, a defoaming agent, an antifungal agent, an antiseptic, an antialgal agent, a pigment dispersant, an antiblocking agent, or a hydrolysis inhibitor.

Examples of the silane coupling agent that can be used in combination with the sizing agent (I) for use in the present invention include aminosilane coupling agents such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxy silane, and γ-anilinopropyltrimethoxysilane; epoxysilane coupling agents such as γ-glycidoxypropyltrimethoxysilane and β-(3,4-epoxycyclohexyl) ethyltrimethoxysilane; chlorosilane coupling agents such as γ-chloropropyltrimethoxysilane; mercaptosilane silane coupling agents such as γ-mercaptotrimethoxysilane; vinylsilane coupling agents such as vinylmethoxysilane and N-β-(N-vinylbenzylaminoethyl)-γ-aminopropyltrimethoxysilan e; and acrylsilane coupling agents such as γ-methacryloxypropyltrimethoxysilane. Among these, aminosilane coupling agents are preferred because higher reactivity between the polyarylene sulfide resin (1) and the inorganic filler (2) is obtained.

Examples of the method for forming a film on the surface of the inorganic filler (2) using the sizing agent (β) of the present invention include a method in which the sizing agent (β) is uniformly applied to the surface by a known method such as a kiss coater method, a roller method, an immersion method, a spray method, or using a brush. When the sizing agent (β) contains an aqueous medium or an organic solvent as a solvent, it is preferable to heat and dry the sizing agent (1) after the application using a heating roller, hot air, a hot plate, or the like.

The adhesion amount (coating amount) of a sizing agent composed of the sizing agent (β) formed on the surface of the inorganic filler (2) is in the range of preferably 0.01 parts by mass or more, more preferably 0.05 parts by mass or more, still more preferably 0.1 parts by mass or more, and most preferably 0.3 parts by mass or more, to preferably 5 parts by mass or less, more preferably 2 parts by mass or less, and still more preferably 1.5 parts by mass or less, with respect to 100 parts by mass of the inorganic filler (2) surface-treated with the sizing agent.

Sizing Agent (γ)

The inorganic filler (2) used in the present invention may be surface-treated with the sizing agent (γ) containing a polyether resin, a urethane resin, and a silane coupling agent. The polyarylene sulfide resin molded article obtained by using the inorganic filler (2) surface-treated with the sizing agent (γ) is excellent in interfacial adhesion with the polyarylene sulfide which is the matrix resin, and hence is excellent in mechanical strength and moisture and heat resistance.

Examples of the polyether resin (γ1) used in the sizing agent (γ) for surface-treating the inorganic filler (2) include polyoxyethylene glycol, polyoxypropylene glycol, polyoxyethylene oxypropylene glycol, polyoxytetramethylene glycol, and an alkyleneoxide adduct of bisphenol having 2 to 4 carbon atoms. Among them, those having an oxyalkylene group having 3 to 5 carbon atoms are preferred, and polypropylene glycol, polyoxyethylene oxypropylene glycol, and polyoxytetramethylene glycol are particularly preferred.

Examples of the urethane resin (γ2) used in the sizing agent (γ) for surface-treating the inorganic filler (2) include conventionally known urethane resins formed from a polyol, a diisocyanate, and optionally a chain extender and/or a crosslinking agent. The production method of the urethane resin is not particularly limited, and a conventional method can be used. For example, the urethane resin may be produced by reacting a polyol, a diisocyanate, and optionally a chain extender and/or a crosslinking agent at a reaction temperature of 50 to 120° C. for 1 to 15 hours in the absence of a solvent or in the presence of an organic solvent.

Examples of the polyol include polyethylene glycol, polypropylene glycol, polyoxyethylene oxypropylene glycol, polyoxytetramethylene glycol, and alkyleneoxide adducts of bisphenols having 2 to 4 carbon atoms, among which those having an oxyalkylene group having 3 to 5 carbon atoms are preferred, and polypropylene glycol, polyoxyethylene oxypropylene glycol, and polyoxytetramethylene glycol are particularly preferred. As the polyol, a polyester polyol may be used. Examples of polycarboxylic acids used as the raw material of the polyester polyol which can be used, in addition to the aforementioned polyols, include aromatic dicarboxylic acids such as terephthalic acid, isophthalic acid, orthophthalic acid, naphthalenedicarboxylic acid, and biphenyldicarboxylic acid; saturated or unsaturated aliphatic dicarboxylic acids such as oxalic acid, succinic acid, succinic anhydride, adipic acid, azelaic acid, sebacic acid, dodecanedioic acid, hydrogenated dimer acid, fumaric acid, maleic acid, maleic anhydride, itaconic acid, itaconic anhydride, citraconic acid, citraconic anhydride, and dimer acid; and dicarboxylic acids having an aliphatic cyclic structure such as 1,4-cyclohexanedicarboxylic acid, 1,3-cyclohexanedicarboxylic acid, 1,2-cyclohexanedicarboxylic acid, 2,5-norbornenedicarboxylic acid and its anhydride, and tetrahydrophthalic acid and its anhydride. Among these, aromatic dicarboxylic acids (anhydrides) are preferably used, and terephthalic acid or isophthalic acid is more preferably used, from the viewpoint of further improving heat resistance. Specific examples of the polyester polyols include polyethylene adipate diol, polybutylene adipate diol, polyethylene butylene adipate diol, polyneopentyl adipate diol, polyneopentylterephthalate diol, poly (ε-caprolactone) diol, polyvalerolactone diol, and polyhexamethylene carbonate diol.

Examples of the diisocyanate include aromatic diisocyanates such as 2,4'- or 4,4'-diphenylmethane diisocyanate (MDI), 2,4- or 2,6-tolylene diisocyanate (TDI), 4,4'-dibenzyl diisocyanate, 1,3- or 1,4-phenylene diisocyanate, 1,5-naphthylene diisocyanate, and xylylene diisocyanate (XDI); and aliphatic diisocyanates or alicyclic diisocyanates such as ethylene diisocyanate, 1,6-hexamethylene diisocyanate (HDI), isophorone diisocyanate (IPDI), hydrogenated tolylene diisocyanate, hydrogenated xylylene diisocyanate, hydrogenated diphenylmethane diisocyanate, 1,3-diisocyanate cyclohexane, 1,4-diisocyanate cyclohexane, dicyclohexylmethane-4,4'-diisocyanate, m-tetramethylxylene diisocyanate, p-tetramethylxylene diisocyanate, 1,4-tetramethylene diisocyanate, 1,12-dodecamethylene diisocyanate, 2,2,4-trimethylcyclohexane diisocyanate, 2,4,4-trimethylcyclohexane diisocyanate, 2,2,4-trimethylhexamethylene diisocyanate, 2,4,4-trimethylhexamethylene diisocyanate, lysine diisocyanate, and norbornane diisocyanate, and two or more kinds of these may be used in combination.

The chain extender and/or the crosslinking agent is preferably an active hydrogen-containing compound having a number-average molecular weight of 30 to 500, and examples thereof include polyhydric alcohols such as dihydric alcohols (such as ethylene glycol, propylene glycol, 1,3-butylene glycol, 1,4-butanediol, 1,6-hexanediol, 3-methylpentanediol, diethylene glycol, neopentyl glycol, 1,4-bis(hydroxymethyl)cyclohexane, 1,4-bis(hydroxyethyl) benzene, and 2,2-bis(4,4'-hydroxycyclohexyl)propane), trihydric alcohols (such as glycerin and trimethylolpropane), and 4- to 8-hydric alcohols (such as pentaerythritol, diglycerin, α-methylglucoside, sorbitol, xylitol, mannitol, dipentaerythritol, glucose, fructose, and sucrose); polyhydric phenols such as pyrogallol, catechol, and hydroquinone; bisphenols such as bisphenol A, bisphenol F, and bisphenol S; aliphatic polyamines such as ethylenediamine, hexamethylenediamine, and diethylenetriamine; alicyclic polyamines such as isophoronediamine and 4,4'-dicyclohexylmethanediamine; aromatic polyamines such as 4,4'-diaminodiphenylmethane; aromatic alicyclic polyamines such as xylylenediamine; carboxylic acids such as dimethylol propionic acid, dimethylol butanoic acid, dimethylol pentanoic acid, dimethylol hexanoic acid, and tartaric acid; and polyamines such as hydrazine or derivatives thereof.

At least one resin selected from the group consisting of the polyether resin (γ1) and the urethane resin (γ2) preferably has an oxyalkylene group having 3 to 5 carbon atoms in the repeating unit.

The silane coupling agent (γ3) used in the sizing agent (γ) for surface-treating the inorganic filler (2) preferably has a functional group having reactivity with the terminal structure of the polyarylene sulfide resin (1) or the terminal structure of the polyether resin (γ1) or the urethane resin (γ2). Examples of such functional groups include an amino group, a glycidyl group, a chloro group, a mercapto group, a vinyl group, and a (meth)acrylic group, with an amino group being particularly preferred.

Examples of the silane coupling agent (γ3) include aminosilane coupling agents such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxy silane, and γ-anilinopropyltrimethoxysilane; epoxysilane coupling agents such as γ-glycidoxypropyltrimethoxysilane and β-(3,4-epoxycyclohexyl) ethyltrimethoxysilane; chlorosilane coupling agents such as γ-chloropropyltrimethoxysilane; mercaptosilane silane coupling agents such as γ-mercaptotrimethoxysilane; vinylsilane coupling agents such as vinylmethoxysilane and N-β-(N-vinylbenzylaminoethyl)-γ-aminopropyltrimethoxysilane; and acrylsilane coupling agents such as γ-methacryloxypropyltrimethoxysilane.

Examples of the method for surface-treating the inorganic filler (2) with the sizing agent (γ) include a method in which a mixture containing the polyether resin (γ1), the urethane resin (γ2), and the silane coupling agent (γ3) is mixed with an emulsifier and stirred, and then the obtained mixture is mixed with the aqueous medium to obtain a dispersion, which is then brought into uniform contact with the surface of the inorganic filler. Specifically, a kiss coater method, a roller method, an immersion method, a spray method, a method using a brush, or other known immersion, coating, or spraying methods may be used. After the contact, the aqueous medium is preferably dried by heating using a heating roller, hot air, a hot plate or the like for the purpose of removing the aqueous medium.

Examples of the aqueous medium include water, organic solvents miscible with water, and mixtures thereof. Examples of the organic solvent miscible with water include alcohol compounds such as methanol, ethanol, n- and iso-propanol; ketone compounds such as acetone and methyl ethyl ketone; polyalkylene glycol compounds such as ethylene glycol, diethylene glycol and propylene glycol; alkyl ether compounds of polyalkylene glycol; and lactam compounds such as N-methyl-2-pyrrolidone. In the present invention, only water may be used, a mixture of water and an organic solvent miscible with water may be used, or only an organic solvent miscible with water may be used. In view of safety and environmental load, water alone or a mixture of water and an organic solvent miscible with water is preferable, and water alone is particularly preferable.

The mass ratio of the aqueous medium in the dispersion is preferably 20% by mass or more, more preferably 30% by mass or more, and preferably 98% by mass or less, more preferably 90% by mass or less, from the viewpoint of further improving storage stability and coating workability.

Moreover, in the dispersion, a known emulsifier or the like may be used as long as the effects of the present invention are not impaired. When the emulsifier is used, the amount thereof is preferably in the range of 0.1 parts by mass or more and 10 parts by mass or less with respect to 100 parts by mass of the total of the polyether resin (γ1) and the urethane resin (γ2). Known additives may be used in combination with the dispersion, if necessary.

The mass ratio of the polyether resin (γ1) and the urethane resin (γ2) in the sizing agent (γ) used in the present invention is such that the polyether resin (γ1) is preferably 20 parts by mass or more, more preferably 30 parts by mass or more, and preferably 90 parts by mass or less, more preferably 80 parts by mass or less, and the remainder is the urethane resin (γ2), with respect to 100 parts by mass of the total of the polyether resin (γ1) and the urethane resin (γ2), from the viewpoint of further improving fiber openability and mechanical strength.

The mass ratio of the silane coupling agent (γ3) in the sizing agent is such that the silane coupling agent (γ3) is preferably 0.1 parts by mass or more, more preferably 1 part by mass or more, and preferably 50 parts by mass or less, more preferably 30 parts by mass or less, with respect to 100 parts by mass of the total of the polyether resin (γ1) and the urethane resin (γ2).

The adhesion amount (coating amount) of the sizing agent (γ) in the surface treatment of the inorganic filler (2) is in the range of preferably 0.01 parts by mass or more, more preferably 0.05 parts by mass or more, still more preferably 0.1 parts by mass or more, most preferably 0.3 parts by mass or more, and preferably 5 parts by mass or less, more preferably 2 parts by mass or less, still more preferably 1.5 parts by mass or less, with respect to 100 parts by mass of the inorganic filler (2) surface-treated with the sizing agent, because higher interfacial adhesion between the polyarylene sulfide resin (1) and the inorganic filler (2) is obtained.

In the polyarylene sulfide resin composition of the present invention, the blending ratio of the inorganic filler (2) blended as an essential component is such that the lower limit is preferably in the range of 1 part by mass or more, more preferably in the range of 10 parts by mass or more, and the upper limit is preferably in the range of 100 parts by mass, more preferably in the range of 80 parts by mass, with respect to 100 parts by mass of the polyarylene sulfide resin. Among the above ranges, from the viewpoint of the molded article exhibiting good moisture and heat resistance and good mechanical strength, the range of 1 to 100 parts by mass is preferable, the range of 10 to 100 parts by mass is more preferable, and from the viewpoint of the resin composition exhibiting good moldability, the range of 1 to 80 parts by mass is preferable, and the range of 10 to 80 parts by mass is more preferable.

Silane Coupling Agent (3)

The polyarylene sulfide resin composition of the present invention may contain a silane coupling agent (3) as an optional component, if necessary. Examples of the silane coupling agent (3) include aminosilane coupling agents such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxy silane, and γ-anilinopropyltrimethoxysilane; epoxysilane coupling agents such as γ-glycidoxypropyltrimethoxysilane and β-(3,4-epoxycyclohexyl) ethyltrimethoxysilane; chlorosilane coupling agents such as γ-chloropropyltrimethoxysilane; mercaptosilane silane coupling agents such as γ-mercaptotrimethoxysilane;

vinylsilane coupling agents such as vinylmethoxysilane and N-β-(N-vinylbenzylaminoethyl)-γ-aminopropyltrimethoxysilan e; and acrylsilane coupling agents such as γ-methacryloxypropyltrimethoxysilane. Among these, aminosilane coupling agents are preferred because higher reactivity between the polyarylene sulfide resin (1) and the inorganic filler (2) surface-treated with the sizing agent is obtained. In the present invention, the silane coupling agent (3) is an optional component, and the blending ratio is not particularly limited, and is, for example, in the range of preferably 0.01 parts by mass or more, more preferably 0.05 parts by mass or more, still more preferably 0.1 parts by mass or more, and preferably 30 parts by mass or less, more preferably 10 parts by mass or less, still more preferably 5 parts by mass or less, with respect to 100 parts by mass of the polyarylene sulfide resin (1). Within such a range, the polyarylene sulfide resin composition of the present invention and a molded article thereof preferably exhibit excellent moisture and heat resistance, mechanical strength, and particularly toughness, and further have excellent fluidity during melting while suppressing the amount of gas generated during molding.

The polyarylene sulfide resin composition of the present invention may further contain an inorganic filler (4) other than the inorganic filler (2) as an optional component, if necessary. As the inorganic filler (4), known and commonly used materials can be used as long as the effects of the present invention are not impaired, and examples thereof include fillers of various shapes such as fibrous fillers and non-fibrous fillers such as granular fillers and plate fillers. Specific examples of the inorganic filler (4) which can be used include fibrous fillers such as glass fiber, carbon fiber, silane glass fiber, ceramic fiber, aramid fiber, metal fiber, potassium titanate fiber, silicon carbide fiber, calcium silicate fiber, wollastonite fiber and natural fiber, and non-fibrous fillers such as glass beads, glass flakes, barium sulfate, clay, pyrophyllite, bentonite, sericite, mica, talc, attapulgite, ferrite, calcium silicate, calcium carbonate, magnesium carbonate, zeolite, milled fiber and calcium sulfate.

In the present invention, the inorganic filler (4) other than the inorganic filler (2) is not an essential component, and the blending ratio thereof is not particularly limited when blended, and is different depending on the respective purposes and cannot be generally defined, but is, for example, in the range of preferably 1 part by mass or more, more preferably 10 parts by mass or more, and preferably 600 parts by mass or less, more preferably 200 parts by mass or less, with respect to 100 parts by mass of the polyarylene sulfide resin (1). Within such a range, the present invention is preferable because the resin composition exhibits good mechanical strength and moldability.

The polyarylene sulfide resin composition of the present invention may contain a thermoplastic elastomer (5) as an optional component, if necessary. Examples of the thermoplastic elastomer (5) include a polyolefin elastomer, a fluorine elastomer, and a silicone elastomer. Of these, a polyolefin elastomer is preferable. When the thermoplastic elastomer (5) is blended, the blending ratio is not particularly limited as long as the effects of the present invention are not impaired, and although it varies depending on the purpose and cannot be generally defined, it is preferably 0.01 parts by mass or more, more preferably 0.1 parts by mass or more, and preferably 10 parts by mass or less, more preferably 5 parts by mass or less, with respect to 100 parts by mass of the polyarylene sulfide resin (1). Within such a range, the present invention is preferable because the obtained polyarylene sulfide resin composition and the obtained molded article have improved impact resistance.

The polyolefin elastomer can be obtained, for example, by homopolymerization of an α-olefin or copolymerization of different α-olefins, and further by copolymerization of an α-olefin and a vinyl polymerizable compound having a functional group when the functional group is imparted. Examples of the α-olefin include those having 2 to 8 carbon atoms such as ethylene, propylene, and butene-1. Examples of the functional group include a carboxyl group, an acid anhydride group represented by the formula —(CO)O(CO)—, an ester thereof, an epoxy group, an amino group, a hydroxyl group, a mercapto group, an isocyanate group, and an oxazoline group.

Specific examples of the vinyl polymerizable compound having such a functional group include α,β-unsaturated carboxylic acids such as (meth)acrylic acids and (meth)acrylic esters and alkyl esters thereof, α,β-unsaturated dicarboxylic acids having 4 to 10 carbon atoms such as maleic acids, fumaric acids and itaconic acids and derivatives thereof (mono- or diesters and acid anhydrides thereof), and glycidyl (meth)acrylate. Among these, an ethylene-propylene copolymer and an ethylene-butene copolymer each having at least one functional group selected from the group consisting of an epoxy group, a carboxy group, and an acid anhydride group are preferable from the viewpoint of improving mechanical strength, particularly toughness and impact resistance.

Furthermore, in addition to the above components, the polyarylene sulfide resin composition of the present invention may further contain, as optional components, according to the intended use, other synthetic resins other than the polyarylene sulfide resin, for example, polyester resins, polyamide resins, polyimide resins, polyetherimide resins, polycarbonate resins, polyphenylene ether resins, polysulfone resins, polyether sulfone resins, polyether ether ketone resins, polyether ketone resins, polyarylene resins, polyethylene resins, polypropylene resins, polytetrafluoroethylene resins, polydifluoroethylene resins, polystyrene resins, ABS resins, phenol resins, urethane resins, liquid crystal polymers, and epoxy resins (hereinafter simply referred to as synthetic resins). In the present invention, the synthetic resin is not an essential component, and in the case of blending, the blending ratio is not particularly limited as long as the effects of the present invention are not impaired, and although the blending ratio is different depending on the respective purposes and cannot be generally defined, the proportion of the resin component (the sum of the polyarylene sulfide resin and the synthetic resin) in the polyarylene sulfide resin composition of the present invention is such that the polyarylene sulfide resin is in the range of 75.0% by mass or more, preferably in the range of 80% by mass or more and 99.99% by mass or less, in other words, the synthetic resin is in the range of 25.0% by mass or less, preferably in the range of 0.01% by mass or more and 20.0% by mass or less and the amount may be appropriately adjusted depending on the purpose or application so as not to impair the effects of the present invention.

In the polyarylene sulfide resin composition of the present invention, known and commonly used additives such as a colorant, an antistatic agent, an antioxidant, a heat-resistant stabilizer, an ultraviolet stabilizer, an ultraviolet absorber, a foaming agent, a flame retardant, a flame retardant auxiliary, a rust inhibitor, and a titanate or aluminate coupling agent may be blended as an optional component, if necessary. These additives are not essential components, and when they are blended, the proportion of the additives is not particularly limited as long as the effects of the present invention are not impaired, and varies depending on the respective purposes and cannot be generally defined, but for example, the additives may be used in an amount of preferably 0.01 parts by mass or more and 1,000 parts by mass or less with respect to 100 parts by mass of the polyarylene sulfide resin (1), and appropriately adjusted according to the purposes and applications so as not to impair the effects of the present invention.

Production Method of Polyarylene Sulfide Resin Composition

In the method for producing the polyarylene sulfide resin composition of the present invention, the polyarylene sulfide resin (1) and the inorganic filler (2) are blended as essential components and melt-kneaded at a temperature equal to or higher than the melting point of the polyarylene sulfide resin (1).

The polyarylene sulfide resin composition of the present invention may be preferably produced by the steps of introducing the polyarylene sulfide resin (1) and the inorganic filler (2) as essential components at the above blending ratio, and, if necessary, the optional components into a ribbon mixer, a Henschel mixer, a V-blender, or the like in various forms such as powders, pellets, and fine pieces, dry-blending them, then introducing the mixture into a known melt-kneading machine such as a Banbury mixer, a mixing roll, a single-screw or twin-screw extruder and a kneader, and melt-kneading the mixture at a resin temperature in the temperature range in which the resin temperature is equal to or higher than the melting point of the polyarylene sulfide resin, preferably in the temperature range of (melting point+10° C.) or higher temperature, more preferably in the temperature range of from (melting point+10° C.) to (melting point+100° C.), and still more preferably in the temperature range of from (melting point+20° C.) to (melting point+50° C.). The addition and mixing of the components to the melt-kneading machine may be carried out simultaneously or separately.

As the melt-kneading machine, a twin screw kneading extruder is preferable from the viewpoint of dispersibility and productivity, and for example, it is preferable to perform melt-kneading while appropriately adjusting the discharge amount of the resin component in the range of 5 (kg/hr) to 500 (kg/hr) and the screw rotation speed in the range of 50 (rpm) to 500 (rpm), and it is more preferable to perform melt-kneading under the condition that the ratio (discharge amount/screw rotation speed) is in the range of 0.02 (kg/hr/rpm) to 5 (kg/hr/rpm). In the case of adding a filler or an additive among the above components, it is preferable from the viewpoint of dispersibility that the filler or the additive is introduced into the extruder from a side feeder of the twin screw kneading extruder. With respect to the position of the side feeder, the ratio of the distance from a resin charging section of the extruder to the side feeder to the total screw length of the twin screw kneading extruder is preferably in the range of 0.1 to 0.9, and particularly preferably in the range of 0.3 to 0.7.

The polyarylene sulfide resin composition of the present invention obtained by melt-kneading is a molten mixture containing the polyarylene sulfide resin (1) and the inorganic filler (2) as essential components, optional components added as required, and components derived therefrom, and is preferably processed into pellets, chips, granules, powder, or the like by a known method after the melt-kneading, and then subjected to preliminary drying at a temperature of 100° C. or higher and 150° C. or lower as necessary to be subjected to various molding.

The polyarylene sulfide resin composition of the present invention produced by the above production method has a morphology in which the polyarylene sulfide resin is used as a matrix, and the inorganic filler (2) as an essential component, a component derived therefrom, and an optional component added as necessary are dispersed in the matrix. It is considered that the sizing agent on the surface of the inorganic filler (2) improves the interfacial adhesion with the polyarylene sulfide resin as the matrix resin, and imparts excellent mechanical strength and excellent moisture and heat resistance to the polyarylene sulfide resin molded article.

The molded article of the present invention is obtained by molding the polyarylene sulfide resin composition. That is, the molded article of the present invention can be obtained by molding the polyarylene sulfide resin composition by various molding methods such as injection molding, compression molding, extrusion molding of composites, sheets, pipes and the like, pultrusion molding, blow molding, and transfer molding, but molding by injection molding is particularly preferable because of excellent releasability. In the case of molding by injection molding, various molding conditions are not particularly limited, and molding can be performed by a general melt molding method. For example, after a step of melting the polyarylene sulfide resin composition in an injection molding machine at a resin temperature in the temperature range in which the resin temperature is equal to or higher than the melting point of the polyarylene sulfide resin, preferably in the temperature range of (melting point+10° C.) or higher temperature, more preferably in the temperature range of from (melting point+10° C.) to (melting point+100° C.), and still more preferably in the temperature range of from (melting point+20° C.) to (melting point+50° C.), the polyarylene sulfide resin composition may be molded by injecting into a mold from a resin discharge port. During molding, the mold temperature can also be set in a known temperature range, for example, in the range of room temperature (23° C.) to 300° C., preferably in the range of 40 to 180° C. The polyarylene sulfide composition of the present invention can be set in a temperature range of 120 to 180° C., which is preferable as a usual molding temperature.

(Application of Molded Article)

The molded article of the present invention is not only excellent in moisture and heat resistance and mechanical properties, particularly in toughness, but also excellent in impact resistance, durability in acidic and alkaline environments, and further has such properties that a decrease in mechanical strength in a hot water environment is not observed. Due to this feature, the resin composition of the present invention can be used for fluid transfer members such as toilet related parts, water heater related parts, pump related parts, bath related parts, and automobile related parts, which handle parts in contact with a fluid, and in particular, for members for use in water where the fluid is water or an aqueous medium containing an organic solvent miscible with water, such as ethylene glycol as found in automobile cooling water. The polyarylene sulfide resin composition and the molded article thereof of the present invention are useful not only as a member for piping but also in the field of valve parts (opening and closing parts) such as valves and plugs. In the field of valve parts (opening and closing parts), a high stress load is generally constantly applied, and damage by an acidic or alkaline detergent and hot water is large, and as a result, it is difficult to use the valve parts for a long period of time, so that the resin composition and the molded article thereof of the invention are highly useful particularly in the field of the opening and closing parts.

The fluid transfer member according to the present embodiment is obtained by molding the polyarylene sulfide resin composition. Examples of these fluid transfer members include pipes, lining pipes, cap nuts, pipe joints (elbow, header, cheese, reducer, joint, coupler, etc.), various valves, flow meters, gaskets (seals, packings), thermal management modules, multi-control valves, thermostats, and various other components attached to pipes for conveying fluids.

In addition, the polyarylene sulfide resin composition and the molded article thereof of the present invention utilize the above excellent characteristics, and are applicable to various applications other than the above, for example, various household electric appliances, housings of electronic devices such as cellular phones and PCs (personal computers), box-shaped protection/support members for electric/electronic component integrated modules, electric/electronic components represented by a plurality of individual semiconductors or modules, sensors, LED lamps, connector, socket, resistor, relay case, switch, coil bobbin, capacitor, variable capacitor case, optical pickup, oscillator, various terminal plates, transformer, plug, printed circuit board, tuner, speaker, microphone, headphone, small motor, magnetic head base, power module, terminal block, semiconductor, liquid crystal, FDD carriage, FDD chassis, motor brush holder, parabolic antenna, and computer related parts; household and office electric appliance parts represented by VTR parts, television parts, irons, hair dryers, rice cooker parts, microwave oven parts, acoustic parts, audio/video equipment parts such as audio, laser disk, compact disk, DVD disk, and Blu-ray disk, lighting parts, refrigerator parts, air conditioner parts, typewriter parts, word processor parts, or water section equipment parts such as water heater, bath level and temperature sensors; machine related parts represented by office computer related parts, telephone set related parts, facsimile related parts, copying machine related parts, cleaning jigs, motor parts, writers, and typewriters; optical equipment and precision machine related parts represented by microscopes, binoculars, cameras, and watches; automobile and vehicle related parts such as alternator terminal, alternator connector, brush holder, slip ring, IC regulator, potentiometer base for light dia, relay block, inhibitor switch, exhaust gas valve and other valves, fuel-related/exhaust/intake system pipes, air intake nozzle snorkel, intake manifold, fuel pump, engine coolant joint, carburetor main body, carburetor spacer, exhaust gas sensor, coolant sensor, oil temperature sensor, brake pad wear sensor, throttle position sensor, crankshaft position sensor, air flow meter, brake pad wear sensor, thermostat base for air conditioner, heating hot air flow control valve, brush holder for radiator motor, water pump impeller, turbine vane, wiper motor related parts, distributor, starter switch, ignition coil and its bobbin, motor insulator, motor rotor, motor core, starter relay, transmission wire harness, window washer nozzle, air conditioner panel switch board, fuel-related electromagnetic valve coil, fuse connector, horn terminal, electrical component insulation plate, step motor rotor, lamp socket, lamp reflector, lamp housing, brake piston, solenoid bobbin, engine oil filter, and ignition device case; and various other applications.

EXAMPLES

Hereinafter, the present invention will be described in more detail with reference to Examples, but the present invention is not limited thereto.

Measurement Example 1: Measurement of Melt Viscosity of Polyphenylene Sulfide Resin The polyphenylene sulfide resin produced in Reference Example was held at 300° C., a load of $1.96 \times 10^6$ Pa, and L/D=10 (mm)/1 (mm) for 6 minutes and then the melt viscosity was measured using a flow tester CFT-500D manufactured by Shimadzu Corporation.

Measurement Example 2: Sulfonate Group and Carboxyl Group Concentration

The concentration of the sulfonate group and the concentration of the carboxyl group are determined by calculation from the charged amount of the raw material.

Measurement Example 3: Acid Value

The acid value is measured in accordance with JIS K0070-1992, and the hydroxyl value is measured in accordance with JIS K1557-1.

Measurement Example 4: Glass Transition Temperature

The glass transition temperature was measured in accordance with JIS K7121 using a DSC Q-100 (manufactured by TA Instruments). The sample from which the solvent had been completely removed by vacuum suction was measured for change in the amount of heat in the range of −100° C. to +200° C. at a temperature rise rate of 20° C./min, and the point at which the straight line equidistant in the vertical axis direction from the straight line extended from each baseline intersects the curve of the stepwise change portion of the glass transition is defined as the glass transition temperature.

Measurement Example 5: Mass Average Molecular Weight (Mw)

The mass average molecular weight (Mw) was measured under the following measurement conditions.

[GPC Measurement Conditions]
Measuring apparatus: High-speed GPC device ("HLC-8220GPC" manufactured by Tosoh Corporation)
Columns: The following columns manufactured by Tosoh Corporation were used by connecting in series.
"TSKgel G5000" (7.8 mmI.D.×30 cm)×1
"TSKgel G4000" (7.8 mmI.D.×30 cm)×1
"TSKgel G3000" (7.8 mmI.D.×30 cm)×1
"TSKgel G2000" (7.8 mmI.D.×30 cm)×1
Detector: RI (differential refractometer)
Column temperature: 40° C.
Eluent: tetrahydrofuran (THF)
Flow rate: 1.0 mL/min
Injection amount: 100 μL (sample concentration: 4 mg/mL tetrahydrofuran solution)
Standard sample: A calibration curve was prepared using the following monodisperse polystyrene.
(Monodisperse Polystyrene)
"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation "TSKgel standard polystyrene F-1" manufactured by Tosoh Corporation "TSKgel standard polystyrene F-2" manufactured by Tosoh Corporation "TSKgel standard polystyrene F-4" manufactured by Tosoh Corporation "TSKgel standard polystyrene F-10" manufactured by Tosoh Corporation "TSKgel standard polystyrene F-20" manufactured by Tosoh Corporation "TSKgel standard polystyrene F-40" manufactured by Tosoh Corporation "TSKgel standard polystyrene F-80" manufactured by Tosoh Corporation "TSKgel standard polystyrene F-128" manufactured by Tosoh Corporation "TSKgel standard polystyrene F-288" manufactured by Tosoh Corporation "TSKgel standard polystyrene F-550" manufactured by Tosoh Corporation (Reference Example 1) Production of Polyphenylene Sulfide Resin (1.1)

33.222 kg (226 mol) of p-dichlorobenzene (hereinafter abbreviated as "p-DCB"), 2.280 kg (23 mol) of NMP, 27.300 kg (230 mol as NaSH) of a 47.23% by mass aqueous NaSH solution, and 18.533 g (228 mol as NaOH) of a 49.21% by mass aqueous NaOH solution were charged into a 150 liter autoclave equipped with a stirring blade to which a pressure gauge, a thermometer, a condenser, a decanter, and a rectifying column were connected, and the temperature was raised to 173° C. over 5 hours under a nitrogen atmosphere with stirring to distill out 27.300 kg of water, and then the autoclave was sealed. The p-DCB azeotropically distilled off during the dehydration was separated in a decanter and optionally returned to the autoclave. In the autoclave after completion of the dehydration, the anhydrous sodium sulfide composition in the form of fine particles was dispersed in p-DCB. Since the content of NMP in this composition was 0.069 kg (0.7 mol), it was shown that 97 mol % (22.3 mol) of the charged NMP was hydrolyzed to sodium salt of ring-opened form of NMP (4-(methylamino) butyric acid) (hereinafter abbreviated as "SMAB"). The amount of SMAB in the autoclave was 0.097 mol per 1 mol of sulfur atoms present in the autoclave. Since the theoretical dehydration amount in the case where the total amount of NaSH and NaOH charged was changed to anhydrous $Na_2S$ was 27.921 g, it was shown that 401 g (22.3 mol) of 621 g (34.5 mol) of the residual amount of water in the autoclave was consumed in the hydrolysis reaction of NMP and NaOH and was not present in the autoclave as water, and the remaining 220 g (12.2 mol) remained in the autoclave in the form of water or crystal water. The amount of water in the autoclave was 0.053 mol per 1 mol of sulfur atoms present in the autoclave.

After completion of the dehydration step, the internal temperature was cooled to 160° C., a solution containing 47.492 kg (479 mol) of NMP was charged, and the temperature was raised to 185° C. The amount of water in the autoclave was 0.025 mol per 1 mol of NMP charged in step 2. When the gauge pressure reached 0.00 MPa, the valve connected to the rectifying column was opened, and the internal temperature was raised to 200° C. over 1 hour. At this time, the rectifying column outlet temperature was controlled by cooling and valve opening so as to be 110° C. or lower. The mixed vapor of distilled p-DCB and water was condensed in a condenser, separated in a decanter, and the p-DCB was returned to the autoclave. The amount of distilled water was 179 g (9.9 mol), the amount of water in the autoclave was 41 g (2.3 mol), 0.005 mol per 1 mol of NMP charged after dehydration, and 0.010 mol per 1 mol of sulfur atoms present in the autoclave. The amount of SMAB in the autoclave was 0.097 mol per 1 mol of sulfur atoms present in the autoclave as in the dehydration.

Then, the internal temperature was raised from 200° C. to 230° C. over 3 hours, and the mixture was stirred at 230° C. for 1.5 hours, then raised to 250° C., and stirred for 1 hour. The gauge pressure at an internal temperature of 200° C. was 0.03 MPa, and the final gauge pressure was 0.30 MPa. After cooling, 6.5 kg of the obtained slurry was poured into 30 liter of 80° C. warm water and stirred for 1 hour, followed by filtration. The obtained filter cake was again stirred with 30 liters of warm water for 1 hour, washed and filtered. Next, 30 liters of water was added to the obtained cake, the pH was adjusted to 4.5 with acetic acid, and the mixture was stirred at room temperature for 1 hour and then filtered. Further, 30 liters of warm water was added to the obtained cake, and the mixture was stirred for 1 hour and then filtered 2 times, followed by drying at 120° C. overnight using a hot air circulating dryer to obtain a PPS resin (hereinafter, referred to as 1.1) as a white powder. The melt viscosity of the obtained polymer was 73 Pa-s. The melting point (Tm) was 282° C.

(Reference Example 2) Production of Polyphenylene Sulfide Resin (1.2)

A PPS resin (hereinafter, referred to as 1.2) as a white powder was obtained in the same manner as in Reference Example 1, except that the procedure of "Then, the internal temperature was raised from 200° C. to 230° C. over 3 hours, and the mixture was stirred at 230° C. for 1.5 hours, then raised to 250° C., and stirred for 1 hour." was changed to "Then, the internal temperature was raised from 200° C. to 230° C. over 3 hours, and the mixture was heated to 250° C. and stirred for 1 hour.". The melt viscosity of the obtained polymer was 13 Pa-s.

(Reference Example 3) Production of Polyphenylene Sulfide Resin (1.3)

A 150 liter autoclave equipped with a pressure gauge, a thermometer, a condenser, a stirring blade, and a bottom valve was charged with 19.413 kg of flake sodium sulfide (60.3 wt % $Na_2S$) and 45.0 kg of NMP. The temperature was raised to 209° C. while stirring under a nitrogen stream, and 4.644 kg of water was distilled out (the residual amount of water was 1.13 mol per 1 mol of sodium sulfide). The autoclave was then sealed and cooled to 180° C., and 22.185 kg of paradichlorobenzene and 18.0 kg of NMP were charged. At a liquid temperature of 150° C., the pressure was increased to 0.1 MPa in gauge pressure using nitrogen gas, and the temperature was raised. The reaction was allowed to proceed with stirring at a liquid temperature of 230° C. for 3 hours and then at 260° C. for 2 hours, and the autoclave was cooled by sprinkling water over the upper part of the autoclave. Then, the temperature was lowered and the cooling of the upper part of the autoclave was stopped. During cooling of the upper part of the autoclave, the liquid temperature was kept constant without being lowered. The maximum pressure during the reaction was 0.85 MPa.

After the reaction, the reaction mixture was cooled, and 650 g of the obtained slurry was poured into 3 liter of water and stirred at 80° C. for 1 hour, followed by filtration. The obtained filter cake was again stirred with 3 liters of warm water for 1 hour, washed and filtered. This procedure was repeated 7 times. The cake was dried overnight at 120° C. using a hot air dryer.

Thereafter, the cake was heat-treated at 190° C. for 3 hours in a hot air dryer to obtain a PPS resin (hereinafter, referred to as 1.3). The melt viscosity of the obtained polymer was 110 Pa·s.

(Example 1) Production of Surface-Modified Chopped GF (2.α)

Synthesis of Urethane-Modified Epoxy Resin (α1)

10 parts by mass of polyethylene glycol (hydroxyl value: 187) and 100 parts by mass of methyl ethyl ketone were added to a four-necked flask equipped with a thermometer, a stirrer, a reflux condenser, and a dropping device, and the mixture was sufficiently stirred and dissolved at 40° C., and then 30 parts by mass of tolylene diisocyanate was added at 40° C., followed by reaction at 60 to 65° C. for 4 hours. Then, 80 parts by mass of bisphenol A type epoxy resin ("Epiclon 1050" manufactured by DIC Corporation, epoxy equivalents: 477 g/equivalent) and 70 parts by mass of polyethylene glycol monomethylether (hydroxyl value: 102) were added and reacted at 60 to 65° C. for 4 hours to obtain a urethane-modified epoxy resin (α1) having a methoxypolyoxyethylene structure and an epoxy group. The mass average molecular weight of the urethane-modified epoxy resin (α1) was 10,000. Then, 19 parts by mass of polyoxyalkylene tridecyl ether ("Noigen XL-400" manufactured by Daiichi Kogyo Seiyaku Co., Ltd.) was added thereto, followed by stirring sufficiently. Then, 736 parts by mass of ion-exchanged water was added dropwise over 30 minutes, followed by stirring and mixing for 15 minutes. The aqueous dispersion was concentrated by distillation under reduced pressure to obtain an aqueous dispersion of urethane-modified epoxy resin (α1) having a nonvolatile content of 30% by mass.

Synthesis of Urethane Resin (α2) Having Sulfonate Group

To a four-necked flask equipped with a thermometer, a stirrer, a reflux condenser and a dropping device, 30 parts by mass of polyester polyol and 60 parts by mass of methyl ethyl ketone were added, and the mixture was sufficiently stirred and dissolved. Then, 34 parts by mass of isophorone diisocyanate and 4 parts by mass of hexamethylene diisocyanate were added and reacted at 80° C. for 3 hours. Then, 95 parts by mass of methyl ethyl ketone was charged and cooled to 60° C., and then 5 parts by mass of 1,4-butylene glycol and 160 parts by mass of polybutylene adipate (hydroxyl value: 37 mgKOH/g, acid value: 0.3 mgKOH/g), which is a polyester composed of 1,4-butylene glycol and adipic acid, were added and reacted at 80° C. Thereafter, after confirming that the isocyanate content was 0.79% or less, the mixture was cooled to 40° C., 280 parts by mass of water was added, and the mixture was sufficiently stirred and mixed, and then 29.7 parts by mass of a 10% aqueous solution of piperazine (95 equivalent % as an amine group with respect to the remaining isocyanate group) was added, followed by emulsifying and dispersing. The obtained emulsion was subjected to desolvation to obtain an aqueous dispersion of a urethane resin (α2) having a sulfonate group with a nonvolatile content of 50% by mass. The urethane resin (α2) having a sulfonate group had a sulfonate group concentration of 0.137 mmol/g, a carboxyl group concentration of 0.004 mmol/g, a mass average molecular weight of 80,000, and a glass transition temperature of −45° C.

Production of Surface-Modified Chopped GF (2.α)

An aqueous dispersion (2.α) having a nonvolatile content of 5% by mass was prepared by mixing 233 parts by mass of the aqueous dispersion of the urethane-modified epoxy resin (α1) (70 parts by mass as the urethane-modified epoxy resin (α1)), 60 parts by mass of the aqueous dispersion of the urethane resin (α2) having a sulfonate group (30 parts by mass as the urethane resin (α2) having a sulfonate group), 0.8 parts by mass of γ-aminopropyltriethoxysilane, and ion-exchanged water.

Subsequently, about 3000 glass filaments having a diameter of about 10 μm were coated with the aqueous dispersion (2.α) obtained above to obtain a glass fiber bundle. Next, the glass fiber bundle was cut into a length of about 3 mm, and then dried using a hot air dryer to obtain a glass fiber chopped strand (2.α) having an adhesion amount of the sizing agent of 0.7% by mass.

(Example 2) Production of Surface-Modified Chopped GF (2.β)

Into a four-necked flask equipped with a stirrer, a reflux condenser, a thermometer and a nitrogen-blowing tube, 95 parts by mass of n-butyl acetate was charged and the temperature was raised to 120° C., and a solution mixture of 98 parts by mass of maleic acid anhydride, 147 parts by mass of n-butyl methacrylate, 75 parts by mass of butyl acetate, 1.6 parts by mass of Perbutyl D (di-tert-butyl hydroperoxide: manufactured by NOF Corporation) and 3.0 parts by mass of Perbutyl Z (tert-butyl peroxybenzoate: manufactured by NOF Corporation) was added dropwise over 2 hours, and the reaction was carried out at 120 to 125° C. Thereafter, the mixture was held at 120° C. for 120 minutes, and then the temperature was lowered to 90° C., and 137 parts by mass of 25% ammonia water and 600 parts by mass of ion-exchanged water were added, followed by neutralization and water dissolution. This was subjected to desolvation (about 60 minutes) and cooling at 90° C. under reduced pressure (0.080 to 0.095 MPa) to obtain a copolymer (β1) having a nonvolatile content of about 23% by mass, a pH of 7.6, a viscosity of 580 MPa·s and a mass average molecular weight of 70,000.

An aqueous dispersion (2.3) was prepared by mixing 3.0% by mass of the copolymer (β1) in terms of solid content and 0.5% by mass of γ-aminopropyltriethoxysilane in terms of solid content.

Subsequently, about 3000 glass filaments having a diameter of about 10 μm were coated with the aqueous dispersion (2.β) obtained above to obtain a glass fiber bundle. Next, the glass fiber bundle was cut into a length of about 3 mm, and then dried using a hot air dryer to obtain a glass fiber chopped strand (2.β) having an adhesion amount of the sizing agent of 0.7% by mass.

(Example 3) Production of Surface-Treated Chopped GF (2.γ1)

To a four-necked flask equipped with a thermometer, a stirrer, a reflux condenser and a dropping device, 63 parts by mass of polyoxytetramethylene glycol (hydroxyl value: 86 mgKOH/g), 0.5 parts by mass of neopentyl glycol, and 38 parts by mass of toluene were added, and the mixture was sufficiently stirred and dissolved. Then, 25 parts by mass of dicyclohexylmethane-4,4'-diisocyanate was added, and the mixture was reacted at 100° C. for 4 hours to obtain a solution of a urethane prepolymer having a terminal isocyanate group.

The urethane prepolymer solution was cooled to 40° C., 97 parts by mass of an aqueous solution containing 7 parts by mass of polyoxyethylene polyoxypropylene glycol having a molecular weight of about 11,000 was added, and the mixture was stirred at high speed with a homomixer to obtain an emulsion of the urethane prepolymer.

Then, 71 parts by mass of an aqueous solution containing 6.5 parts by mass of isophoronediamine was added to the emulsion of the urethane prepolymer with stirring to complete the chain extension reaction, followed by distillation under reduced pressure to obtain a urethane resin aqueous dispersion having a nonvolatile content of 40% by mass.

5 parts by mass of the urethane resin aqueous dispersion obtained above, 2 parts by mass of polyoxyethylene polyoxypropylene glycol, 0.8 parts by mass of γ-aminopropyltriethoxysilane, 0.1 parts by mass of fatty acid amide, and 89.1 parts by mass of water were mixed and stirred to obtain a glass fiber sizing agent (2.γ1) having a nonvolatile content of 4.9% by mass.

Subsequently, about 3000 glass filaments having a diameter of about 10 μm were coated with the aqueous dispersion (2.γ1) obtained above to obtain a glass fiber bundle. Next, the glass fiber bundle was cut into a length of about 3 mm, and then dried using a hot air dryer to obtain a glass fiber chopped strand (2.γ1) having an adhesion amount of the sizing agent of 0.7% by mass.

(Example 4) Production of Surface-Treated Chopped GF (2.γ2)

A glass fiber chopped strand (2.γ2) was obtained in the same manner as in Example 3, except that the procedure of "5 parts by mass of the urethane resin aqueous dispersion obtained above, 2 parts by mass of polyoxyethylene polyoxypropylene glycol, 0.8 parts by mass of γ-aminopropyltriethoxysilane, 0.1 parts by mass of fatty acid amide, and 89.1 parts by mass of water were mixed" was changed to "2 parts by mass of the urethane resin aqueous dispersion obtained above, 3.2 parts by mass of polyoxyethylene polyoxypropylene glycol, 0.8 parts by mass of γ-aminopropyltriethoxysilane, 0.1 parts by mass of fatty acid amide, and 89.1 parts by mass of water were mixed".

(Example 5) Production of Surface-Treated Chopped GF (2.γ3)

A glass fiber chopped strand (2.γ3) was obtained in the same manner as in Example 3, except that the procedure of "5 parts by mass of the urethane resin aqueous dispersion obtained above, 2 parts by mass of polyoxyethylene polyoxypropylene glycol, 0.8 parts by mass of γ-aminopropyltriethoxysilane, 0.1 parts by mass of fatty acid amide, and 89.1 parts by mass of water were mixed" was changed to "8 parts by mass of the urethane resin aqueous dispersion obtained above, 0.8 parts by mass of polyoxyethylene polyoxypropylene glycol, 0.8 parts by mass of γ-aminopropyltriethoxysilane, 0.1 parts by mass of fatty acid amide, and 89.1 parts by mass of water were mixed".

(Comparative Example 1) Production of Chopped GF (2.c1) for Comparative Example

To a four-necked flask equipped with a thermometer, a stirrer, a reflux condenser and a dropping device, 89 parts by mass of polybutylene adipate diol, 0.5 parts by mass of neopentyl glycol, and 38 parts by mass of toluene were added, and the mixture was sufficiently stirred and dissolved.

Then, 16 parts by mass of 1,6-hexamethylene diisocyanate was added, and the mixture was reacted at 100° C. for 4 hours to obtain a urethane prepolymer solution having a terminal isocyanate group.

The urethane prepolymer solution was cooled to 40° C., 97 parts by mass of an aqueous solution containing 7 parts by mass of polyoxyethylene polyoxypropylene glycol having a molecular weight of about 11,000 was added, and the mixture was stirred at high speed with a homomixer to obtain an emulsion of the urethane prepolymer.

Then, 71 parts by mass of an aqueous solution containing 6.5 parts by mass of isophoronediamine was added to the emulsion of the urethane prepolymer with stirring to complete the chain extension reaction, followed by distillation under reduced pressure to obtain a urethane resin aqueous dispersion having a nonvolatile content of 40% by mass.

5 parts by mass of the urethane resin aqueous dispersion obtained above, 10 parts by mass of a 20% (active ingredient) aqueous dispersion of a phenol novolac type epoxy resin ("Epiclon N-770" manufactured by DIC Corporation, epoxy equivalent: 187 g/equivalent), 0.8 parts by mass of γ-aminopropyltriethoxysilane, 0.1 parts by mass of fatty acid amide, and 89.1 parts by mass of water were mixed and stirred to obtain a glass fiber sizing agent (2.c1) having a nonvolatile content of 4.9% by mass.

Thereafter, about 3000 glass filaments having a diameter of about 10 μm were coated with the glass fiber sizing agent (2.c1) obtained above to obtain a glass fiber bundle. Next, the glass fiber bundle was cut into a length of about 3 mm, and then dried using a hot air dryer to obtain a glass fiber chopped strand (2.c1) having an adhesion amount of the sizing agent of 0.7% by mass.

(Examples 6 to 25 and Comparative Examples 2 to 4) Production of PPS Resin Compositions and Molded Articles Each material was uniformly mixed in a tumbler according to the composition components and the blending amounts (all parts by mass) described in Tables 1 to 8. Thereafter, the blended materials were charged into a vented twin screw extruder "TEM-35B" manufactured by Toshiba Machine Co., Ltd., and melt-kneaded at a resin component discharge rate of 25 kg/hr, a screw rotation speed of 250 rpm, a ratio of the resin component discharge rate (kg/hr) to the screw rotation speed (rpm) (discharge rate/screw rotation speed)=0.1 (kg/hr·rpm), and a set resin temperature of 330° C. to obtain pellets of a resin composition. The pellets were subjected to various evaluation tests. The results of the tests and evaluations are shown in Tables 1 to 8.

(Measurement Example 6) Measurement of Mechanical Strength (MD Direction) Tensile Strength, Tensile Elongation The obtained pellets were supplied to an injection molding machine (SG75-HIPRO MIII) manufactured by Sumitomo Heavy Industries, Ltd. having a cylinder temperature set at 320° C., and injection molding was performed using a die for molding an ISO Type-A dumbbell piece, which has a die temperature adjusted to 130° C., to prepare test pieces. In order to obtain a test piece containing no weld portion, a resin was injected from the one-point gate of the ISO Type-A dumbbell piece. The dimensions of the test portion in the test piece were 80 mm in length, 10 mm in width, and 4 mm in thickness. In order to evaluate the "tensile strength" and the "tensile elongation" in the flow direction (injection direction), the obtained test pieces were measured by a measurement method in accordance with ISO 527-1 and 2.

Weld Strength

The obtained pellets were supplied to an injection molding machine (SG75-HIPRO MIII) manufactured by Sumitomo Heavy Industries, Ltd. having a cylinder temperature set at 320° C., and injection molding was performed using a die for molding an ISO Type-A dumbbell piece, which has a die temperature adjusted to 130° C., to prepare test pieces. In order to obtain a test piece including a weld portion, a resin was injected from the two-point gates of the ISO Type-A dumbbell piece to form a weld portion. The dimensions of the test portion in the test piece were 80 mm in length, 10 mm in width, and 4 mm in thickness. In order to evaluate the "weld strength" in the flow direction (injection direction), the obtained test pieces were measured by a measurement method in accordance with ISO 527-1 and 2.

(Measurement Example 7) Measurement of Moisture and Heat Resistance (Holding Strength after Immersion in Cooling Water)

As a test piece for evaluating the moisture and heat resistance, a ISO Type-A dumbbell test piece was prepared and used in the measurement test. The obtained test piece was immersed in cooling water at a high temperature of 140° C. for 3000 hours, and the tensile strength was measured by a method in accordance with ISO 527 using "AGS-J" manufactured by Shimadzu Corporation.

TABLE 1

|  |  |  | Unit | Example 6 | Example 7 | Example 8 |
|---|---|---|---|---|---|---|
| PPS resin | 1.1 | Parts by mass | | 59.5 | | |
|  | 1.2 | Parts by mass | | | 59.5 | |
|  | 1.3 | Parts by mass | | | | 59.5 |
| Inorganic filler | 2.α | Parts by mass | | 40 | 40 | 40 |
| Silane coupling agent | 3.1 | Parts by mass | | 0.5 | 0.5 | 0.5 |
|  | 3.2 | Parts by mass | | | | |
| Other additive | 4.1 | Parts by mass | | | | |
| Tensile strength | | | MPa | 210 | 185 | 195 |
| Tensile elongation | | | % | 1.9 | 1.6 | 1.7 |
| Weld strength | | | MPa | 80 | 60 | 65 |
| Holding strength after immersion in cooling water (after 3000 hours) | | | MPa | 185 | 160 | 170 |

TABLE 2

|  |  |  | Unit | Example 9 | Example 10 | Example 11 |
|---|---|---|---|---|---|---|
| PPS resin | 1.1 | Parts by mass | | 59.5 | 54.5 | |
|  | 1.2 | Parts by mass | | | | 35.5 |
|  | 1.3 | Parts by mass | | | | |
| Inorganic filler | 2.α | Parts by mass | | 40 | 30 | 30 |
|  | 2.c2 | Parts by mass | | | | 34 |
| Silane coupling agent | 3.1 | Parts by mass | | | 0.5 | 0.5 |
|  | 3.2 | Parts by mass | | 0.5 | | |
| Other additive | 4.1 | Parts by mass | | | 5 | |
| Tensile strength | | | MPa | 215 | 180 | 185 |
| Tensile elongation | | | % | 1.9 | 2.0 | 1.0 |
| Weld strength | | | MPa | 80 | 70 | 50 |
| Holding strength after immersion in cooling water (after 3000 hours) | | | MPa | 175 | 160 | 160 |

TABLE 3

|  |  |  | Unit | Example 12 | Example 13 | Example 14 |
|---|---|---|---|---|---|---|
| PPS resin | 1.1 | Parts by mass | | 59.5 | | |
|  | 1.2 | Parts by mass | | | 59.5 | |
|  | 1.3 | Parts by mass | | | | 59.5 |
| Inorganic filler | 2.β | Parts by mass | | 40 | 40 | 40 |
|  | 2.c2 | Parts by mass | | | | |
| Silane coupling agent | 3.1 | Parts by mass | | 0.5 | 0.5 | 0.5 |
|  | 3.2 | Parts by mass | | | | |
| Other additive | 4.1 | Parts by mass | | | | |
| Tensile strength | | | MPa | 205 | 175 | 180 |
| Tensile elongation | | | % | 1.7 | 1.4 | 1.6 |
| Weld strength | | | MPa | 80 | 60 | 65 |
| Holding strength after immersion in cooling water (after 3000 hours) | | | MPa | 185 | 155 | 160 |

TABLE 4

|  |  |  | Unit | Example 15 | Example 16 | Example 17 |
|---|---|---|---|---|---|---|
| PPS resin | 1.1 | Parts by mass | | 59.5 | 54.5 | |
|  | 1.2 | Parts by mass | | | | 35.5 |
|  | 1.3 | Parts by mass | | | | |
| Inorganic filler | 2.β | Parts by mass | | 40 | 30 | 30 |
|  | 2.c2 | Parts by mass | | | | 34 |
| Silane coupling agent | 3.1 | Parts by mass | | | 0.5 | 0.5 |
|  | 3.2 | Parts by mass | | 0.5 | | |
| Other additive | 4.1 | Parts by mass | | | 5 | |

TABLE 4-continued

|  | Unit | Example 15 | Example 16 | Example 17 |
|---|---|---|---|---|
| Tensile strength | MPa | 210 | 175 | 180 |
| Tensile elongation | % | 1.7 | 2.0 | 1.0 |
| Weld strength | MPa | 80 | 70 | 55 |
| Holding strength after immersion in cooling water (after 3000 hours) | MPa | 180 | 160 | 160 |

TABLE 5

|  |  |  | Example 18 | Example 19 | Example 20 |
|---|---|---|---|---|---|
|  | Unit |  |  |  |  |
| PPS resin | 1.1 | Parts by mass | 59.5 |  |  |
|  | 1.2 | Parts by mass |  | 59.5 |  |
|  | 1.3 | Parts by mass |  |  | 59.5 |
| Inorganic filler | 2.γ1 | Parts by mass | 40 | 40 | 40 |
| Silane coupling agent | 3.1 | Parts by mass | 0.5 | 0.5 | 0.5 |
|  | 3.2 | Parts by mass |  |  |  |
| Other additive | 4.1 | Parts by mass |  |  |  |
| Tensile strength |  | MPa | 200 | 170 | 180 |
| Tensile elongation |  | % | 2.0 | 1.7 | 1.8 |
| Weld strength |  | MPa | 80 | 60 | 65 |
| Holding strength after immersion in cooling water (after 3000 hours) |  | MPa | 180 | 155 | 160 |

TABLE 6

|  |  |  | Example 21 | Example 22 | Example 23 |
|---|---|---|---|---|---|
|  | Unit |  |  |  |  |
| PPS resin | 1.1 | Parts by mass | 59.5 | 54.5 |  |
|  | 1.2 | Parts by mass |  |  | 35.5 |
|  | 1.3 | Parts by mass |  |  |  |
| Inorganic filler | 2.γ1 | Parts by mass | 40 | 30 | 30 |
|  | 2.c2 | Parts by mass |  |  | 34 |
| Silane coupling agent | 3.1 | Parts by mass |  | 0.5 | 0.5 |
|  | 3.2 | Parts by mass | 0.5 |  |  |
| Other additive | 4.1 | Parts by mass |  | 5 |  |
| Tensile strength |  | MPa | 210 | 170 | 170 |
| Tensile elongation |  | % | 1.9 | 2.1 | 1.1 |
| Weld strength |  | MPa | 80 | 70 | 50 |
| Holding strength after immersion in cooling water (after 3000 hours) |  | MPa | 165 | 150 | 150 |

TABLE 7

|  |  |  | Example 24 | Example 25 |
|---|---|---|---|---|
|  | Unit |  |  |  |
| PPS resin | 1.1 | Parts by mass | 59.5 | 59.5 |
|  | 1.2 | Parts by mass |  |  |
|  | 1.3 | Parts by mass |  |  |
| Inorganic filler | 2.γ2 | Parts by mass | 40 |  |
|  | 2.γ3 | Parts by mass |  | 40 |
| Silane coupling agent | 3.1 | Parts by mass | 0.5 | 0.5 |
|  | 3.2 | Parts by mass |  |  |
| Other additive | 4.1 | Parts by mass |  |  |
| Tensile strength |  | MPa | 190 | 200 |
| Tensile elongation |  | % | 2.2 | 1.9 |
| Weld strength |  | MPa | 80 | 80 |
| Holding strength after immersion in cooling water (after 3000 hours) |  | MPa | 175 | 180 |

TABLE 8

|  |  |  | Comparative Example 2 | Comparative Example 3 | Comparative Example 4 |
|---|---|---|---|---|---|
|  | Unit |  |  |  |  |
| PPS resin | 1.1 | Parts by mass | 59.5 | 54.5 |  |
|  | 1.2 | Parts by mass |  |  | 35.5 |
|  | 1.3 | Parts by mass |  |  |  |
| Inorganic filler | 2.c1 | Parts by mass | 40 | 30 | 30 |
|  | 2.c2 | Parts by mass |  |  | 34 |
| Silane coupling agent | 3.1 | Parts by mass |  | 0.5 | 0.5 |
|  | 3.2 | Parts by mass | 0.5 |  |  |
| Other additive | 4.1 | Parts by mass |  | 5 |  |
| Tensile strength |  | MPa | 190 | 150 | 160 |
| Tensile elongation |  | % | 1.7 | 2.0 | 1.0 |
| Weld strength |  | MPa | 68 | 60 | 45 |
| Holding strength after immersion in cooling water (after 3000 hours) |  | MPa | 135 | 120 | 110 |

The blending ratios of the blending resins and materials in Tables 1 to 8 are parts by mass, and the followings were used.

2.c2: Calcium carbonate (average particle diameter 5 [μm])

3.1: 3-Aminopropyltriethoxysilane 3.2: γ-Glycidoxypropyltrimethoxysilane 4.1: Thermoplastic elastomer ("Bondfast 7L" manufactured by Sumitomo Chemical Co., Ltd., in which ethylene is copolymerized with glycidyl methacrylate (3 parts by mass) and methyl acrylate (27 parts by mass))

The invention claimed is:

1. A polyarylene sulfide resin composition comprising:
100 parts by mass of a polyarylene sulfide resin (1); and
1 to 100 parts by mass of an inorganic filler (2) surface-treated with a sizing agent, wherein the sizing agent is a sizing agent (γ) containing at least a polyether resin (γ1), a urethane resin (γ2), and a silane coupling agent (γ3), wherein the polyether resin (γ1) is selected from the group consisting of polyoxypropylene glycol, polyoxytetramethylene glycol, and an alkyleneoxide adduct of bisphenol having 2 to 4 carbon atoms, wherein the urethane resin (γ2) is formed from a polyol selected from the group consisting of polyethylene glycol, polypropylene glycol, polyoxyethylene oxypropylene glycol, and polyoxytetramethylene glycol, and wherein at least one resin selected from the group consisting of the polyether resin (γ1) and the urethane resin (γ2) has a polyoxytetramethylene glycol group in the repeating unit.

2. The polyarylene sulfide resin composition according to claim 1, further comprising a silane coupling agent (3) in an amount of 0.01 to 5 parts by mass with respect to 100 parts by mass of the polyarylene sulfide resin (1).

3. A molded article comprising a product obtained by molding the polyarylene sulfide resin composition according to claim 1.

4. A method for producing a polyarylene sulfide resin composition of claim 1, comprising blending 1 to 100 parts by mass of the inorganic filler (2) surface-treated with the sizing agent with respect to 100 parts by mass of the polyarylene sulfide resin (1), and melt-kneading the mixture.

5. The method for producing a polyarylene sulfide resin composition according to claim 4, wherein the polyarylene sulfide resin (1) and the inorganic filler (2) surface-treated with a sizing agent are further blended with a silane coupling agent (3) in an amount of 0.01 to 5 parts by mass with respect to 100 parts by mass of the polyarylene sulfide resin (1), followed by melt-kneading.

6. A method for producing a molded article, comprising melt molding the polyarylene sulfide resin composition obtained by the method according to claim 4.

7. An inorganic filler used in a polyarylene sulfide resin composition containing a polyarylene sulfide resin (1), wherein the inorganic filler is surface-treated with a sizing agent, and the sizing agent is a sizing agent (γ) containing at least a polyether resin (γ1), a urethane resin (γ2), and a silane coupling agent (γ3) wherein the polyether resin (γ1) is selected from the group consisting of polyoxypropylene glycol, polyoxytetramethylene glycol, and an alkyleneoxide adduct of bisphenol having 2 to 4 carbon atoms, wherein the urethane resin (γ2) is formed from a polyol selected from the group consisting of polyethylene glycol, polypropylene glycol, polyoxyethylene oxypropylene glycol, and polyoxytetramethylene glycol, and wherein at least one resin selected from the group consisting of the polyether resin (γ1) and the urethane resin (γ2) has a polyoxytetramethylene glycol in the repeating unit.

8. A method for producing an inorganic filler used in a polyarylene sulfide resin composition including a polyarylene sulfide resin (1), comprising surface-treating the inorganic filler with a sizing agent, wherein the sizing agent is a sizing agent (γ) containing at least a polyether resin (γ1), a urethane resin (γ2), and a silane coupling agent (γ3) wherein the polyether resin (γ1) is selected from the group consisting of polyoxypropylene glycol, polyoxytetramethylene glycol, and an alkyleneoxide adduct of bisphenol having 2 to 4 carbon atoms, wherein the urethane resin (γ2) is formed from a polyol selected from the group consisting of polyethylene glycol, polypropylene glycol, polyoxyethylene oxypropylene glycol, and polyoxytetramethylene glycol, and wherein at least one resin selected from the group consisting of the polyether resin (γ1) and the urethane resin (γ2) has a polyoxytetramethylene glycol in the repeating unit.

9. The polyarylene sulfide resin composition according to claim 1, wherein a polyol constituting the urethane resin (γ2) is polyoxytetramethylene glycol.

10. The method for producing a polyarylene sulfide resin composition according to claim 4, wherein a polyol constituting the urethane resin (γ2) is polyoxytetramethylene glycol.

11. The inorganic filler according to claim 7, wherein a polyol constituting the urethane resin (γ2) is polyoxytetramethylene glycol.

12. The method for producing an inorganic filler according to claim 8, wherein a polyol constituting the urethane resin (γ2) is polyoxytetramethylene glycol.

\* \* \* \* \*